US010854375B2

(12) United States Patent
Song et al.

(10) Patent No.: US 10,854,375 B2
(45) Date of Patent: Dec. 1, 2020

(54) ELECTRONIC DEVICE INCLUDING SLOTTED CONDUCTIVE HOUSING FOR EDDY CURRENT CONTROL DURING WIRELESS CHARGING

(71) Applicant: Samsung Electronics Co., Ltd., Suwon-si, Gyeonggi-do (KR)

(72) Inventors: Keum Su Song, Seoul (KR); Ji Won Kim, Suwon-si (KR); Se Ho Park, Yongin-si (KR); Ki Tae Lee, Suwon-si (KR); Chang Ho Lee, Suwon-si (KR); Chi Hyun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 15/805,601

(22) Filed: Nov. 7, 2017

(65) Prior Publication Data
US 2018/0144861 A1  May 24, 2018

(30) Foreign Application Priority Data
Nov. 24, 2016  (KR) .......................... 10-2016-0157363

(51) Int. Cl.
*H02J 7/00* (2006.01)
*H01F 27/36* (2006.01)
(Continued)

(52) U.S. Cl.
CPC ......... *H01F 27/36* (2013.01); *H01F 27/2885* (2013.01); *H01F 38/14* (2013.01);
(Continued)

(58) Field of Classification Search
CPC ................. H01F 27/36; H01F 27/2885; H01F 2027/348; H01F 38/14; H02J 50/10; H02J 50/12; H04B 5/0037; H04B 5/0081
(Continued)

(56) References Cited

U.S. PATENT DOCUMENTS 6,760,278 B2   7/2004  Matsumoto et al.
8,976,075 B2   3/2015  Kato et al.
(Continued)

FOREIGN PATENT DOCUMENTS

CN   104377424 A   2/2015
CN   204333273 U   5/2015
(Continued)

OTHER PUBLICATIONS

International Search Report dated Feb. 5, 2018, issued in International Patent Application No. PCT/KR2017/011827.
(Continued)

*Primary Examiner* — Nathaniel R Pelton
(74) *Attorney, Agent, or Firm* — Jefferson IP Law, LLP

(57) ABSTRACT

An electronic device is provided. The electronic device includes a housing and a first coil disposed in the housing and wound around a space formed inside. The housing includes a front cover and a rear cover. The rear cover includes a hole located in a first region of the rear cover that corresponds to the space of the first coil, a first slit that extends from an edge of the rear cover to the hole, and a second slit spaced apart from the first slit and extending from the edge. One end of the second slit is located in a second region of the rear cover that corresponds to the first coil. In addition, various other embodiments recognized through the present specification are possible.

20 Claims, 21 Drawing Sheets

(51) Int. Cl.
  *H04B 5/00* (2006.01)
  *H01F 27/28* (2006.01)
  *H01F 38/14* (2006.01)
  *H02J 7/02* (2016.01)
  *H01F 27/34* (2006.01)

(52) U.S. Cl.
  CPC ............ *H02J 7/025* (2013.01); *H04B 5/0037* (2013.01); *H04B 5/0081* (2013.01); *H01F 2027/348* (2013.01)

(58) Field of Classification Search
  USPC ....................................................... 320/108
  See application file for complete search history.

(56) References Cited

U.S. PATENT DOCUMENTS

| | | | |
|---|---|---|---|
| 9,000,619 | B2 | 4/2015 | Kato et al. |
| 9,065,182 | B2 | 6/2015 | Kato et al. |
| 9,203,157 | B2 | 12/2015 | Kato et al. |
| 9,397,727 | B1 | 7/2016 | Mattsson et al. |
| 9,455,498 | B2 | 9/2016 | Yosui |
| 9,461,500 | B2 * | 10/2016 | Tseng ..................... H02J 7/025 |
| 9,502,753 | B2 | 11/2016 | Murayama et al. |
| 9,537,200 | B2 | 1/2017 | Kato et al. |
| 9,564,678 | B2 | 2/2017 | Kato et al. |
| 9,577,468 | B2 | 2/2017 | Tseng et al. |
| 9,768,511 | B2 | 9/2017 | Nakano et al. |
| 9,812,766 | B2 | 11/2017 | Kato |
| 9,847,579 | B2 | 12/2017 | Nakano et al. |
| 10,205,489 | B2 | 2/2019 | Baek et al. |
| 2003/0107954 | A1 | 6/2003 | Matsumoto et al. |
| 2012/0091821 | A1 | 4/2012 | Kato et al. |
| 2012/0262357 | A1 | 10/2012 | Kato et al. |
| 2013/0113662 | A1 | 5/2013 | Kato et al. |
| 2013/0234905 | A1 | 9/2013 | Kato et al. |
| 2013/0300622 | A1 | 11/2013 | Kato et al. |
| 2013/0307746 | A1 * | 11/2013 | Nakano ................ H01Q 1/2225 343/850 |
| 2014/0133741 | A1 | 5/2014 | Wang |
| 2014/0159974 | A1 | 6/2014 | Kato et al. |
| 2014/0340273 | A1 | 11/2014 | Kato et al. |
| 2015/0050968 | A1 | 2/2015 | Jeon et al. |
| 2015/0097735 | A1 | 4/2015 | Kim et al. |
| 2015/0137742 | A1 | 5/2015 | Tseng et al. |
| 2015/0171509 | A1 | 6/2015 | Kato et al. |
| 2015/0244064 | A1 * | 8/2015 | Murayama ........... H01Q 1/2216 343/702 |
| 2016/0043460 | A1 | 2/2016 | Kato et al. |
| 2016/0064826 | A1 | 3/2016 | Nakano et al. |
| 2016/0352136 | A1 | 12/2016 | Tseng et al. |
| 2017/0019510 | A1 | 1/2017 | Jeon et al. |
| 2017/0125878 | A1 | 5/2017 | Kato et al. |
| 2017/0352957 | A1 | 12/2017 | Nakano et al. |

FOREIGN PATENT DOCUMENTS

| | | |
|---|---|---|
| CN | 104979625 A | 10/2015 |
| CN | 105637704 A | 6/2016 |
| JP | 2003-178498 A | 6/2003 |
| WO | WO2014/156285 A1 | 2/2017 |

OTHER PUBLICATIONS

European Search Report dated Apr. 16, 2018, issued in European Patent Application No. 17203540.4-1220.

Chinese Office Action with English translation dated Aug. 5, 2020; Chinese Appln No. 201711179778.3.

* cited by examiner

ELECTRONIC DEVICE INCLUDING SLOTTED CONDUCTIVE HOUSING FOR EDDY CURRENT CONTROL DURING WIRELESS CHARGING

CROSS-REFERENCE TO RELATED APPLICATION(S)

This application claims the benefit under 35 U.S.C. § 119(a) of a Korean patent application filed on Nov. 24, 2016 in the Korean Intellectual Property Office and assigned Serial number 10-2016-0157363, the entire disclosure of which is hereby incorporated by reference.

TECHNICAL FIELD

The present disclosure relates to an electronic device that includes a conductive housing and a non-conductive pattern.

BACKGROUND

Electronic devices, such as smartphones, wearable devices, and the like, have been widely used with the development of mobile communication technologies. An electronic device may include many components to provide various functions (e.g., music playback, video capture, and the like). For example, the electronic device may include a graphic processing unit (GPU) to provide a graphical user interface (GUI) through a display module.

The electronic device may include a housing for protecting the aforementioned components. The housing may receive the components between front and rear covers thereof to protect the components from an external shock. The front cover of the housing may be disposed on the front face of the electronic device (the face through which a display is exposed) to form the exterior of the electronic device. The front cover may include glass, a plastic injection-molded material, a conductive member, or the like. The rear cover of the housing may be disposed on the rear face of the electronic device to protect the components. The rear cover may also include a plastic injection-molded material, a conductive member, or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for solving the above-mentioned problems and disadvantages.

In the case where the rear cover includes a conductive member, eddy current may be generated in the rear cover while a battery is being wirelessly charged. The eddy current may be a current flowing in a region of the rear cover that corresponds to a power-receiving coil disposed in the housing. The direction of the eddy current may be opposite to that of current flowing in the power-receiving coil. Since the direction of the eddy current is opposite to that of the current flowing in the power-receiving coil, the direction of a magnetic field induced by the eddy current may also be opposite to the direction of a magnetic field induced by the power-receiving coil. Accordingly, the magnetic field induced by the eddy current may cancel the magnetic field induced by the power-receiving coil.

If the strength of the magnetic field induced by the power-receiving coil decreases, the amount of current flowing in the power-receiving coil may decrease. If the amount of current flowing in the power-receiving coil decreases, power charged in the battery may also decrease. Accordingly, wireless charging efficiency may decrease if eddy current is generated in the rear cover.

In the case where the rear cover includes a conductive member, eddy current may be generated in the rear cover even while wireless communication (e.g., near field communication (NFC), magnetic stripe transmission (MST), or the like) is being performed. Since the eddy current flows in the opposite direction to that in which current flows in a communication coil, a magnetic field induced by the eddy current may cancel a magnetic field induced by the communication coil. Accordingly, communication efficiency may decrease if eddy current is generated while wireless communication is being performed.

In accordance with an aspect of the present disclosure, an electronic device is provided. The electronic device includes a housing and a first coil disposed in the housing and wound around a space formed inside. The housing includes a front cover and a rear cover. The rear cover includes a hole located in a first region of the rear cover that corresponds to the space of the first coil, a first slit extended from an edge of the rear cover to the hole, and a second slit spaced apart from the first slit and extended from the edge. One end of the second slit is located in a second region of the rear cover that corresponds to the first coil.

In accordance with another aspect of the present disclosure, an electronic device is provided. The electronic device includes a housing, a battery disposed in the housing, and a first coil disposed between one face of the housing and the battery and wound around a space formed inside. The housing includes a front cover and a rear cover. The rear cover includes a hole located in a first region of the rear cover that corresponds to the space of the first coil, a first slit extended from an edge of the rear cover to the hole, a second slit spaced apart from the first slit and having one end located in a second region of the rear cover that corresponds to the first coil, and a third slit spaced apart from the first slit and disposed on the opposite side to the second slit with respect to the first slit.

In accordance with another aspect of the present disclosure, an electronic device is provided. The electronic device includes a housing that includes a first plate, a second plate opposite the first plate, and a side member surrounding space between the first plate and the second plate, a display exposed through at least a portion of the first plate, a printed circuit board (PCB) inserted between the display and the second plate, a conductive coil inserted between the PCB and the second plate, a wireless charging circuit electrically connected with the coil, and a processor electrically connected with the wireless charging circuit. The conductive coil may be wound on a plane parallel to the second plate with respect to an axis substantially normal to the second plate. When viewed from above the second plate, the conductive coil may include an outer periphery and an inner periphery that forms an inner space. The second plate may include a conductive plate that forms a large portion of the second plate, a non-conductive portion formed through the conductive plate and having a size and shape corresponding to the size and shape of the inner space of the coil when viewed from above the second plate, the non-conductive portion facing the inner space of the coil, a first non-conductive slit formed through the conductive plate and extending from a first portion of an edge of the conductive plate to the non-conductive portion when viewed from above the second plate, a second non-conductive slit formed through the conductive plate and extending from a second portion of the edge of the conductive plate to a first point within the coil when viewed from above the second plate, and a third non-conductive slit formed through the conductive plate and extending from a third portion of the edge of the conductive plate to a second point within the coil when viewed from above the second plate. The first portion of the edge of the conductive plate may be located between the second and third portions of the edge of the conductive plate when viewed from above the second plate. The first non-conductive slit may extend between the second non-conductive slit and the third non-conductive slit when viewed from above the second plate.

In accordance with another aspect of the present disclosure, an electronic device is provided. The electronic device includes a housing that includes a first plate, a second plate opposite the first plate, and a side member surrounding space between the first plate and the second plate, a display exposed through at least a portion of the first plate, a PCB inserted between the display and the second plate, a conductive coil inserted between the PCB and the second plate, a wireless charging circuit electrically connected with the coil, and a processor electrically connected with the wireless charging circuit. The conductive coil may be wound on a plane parallel to the second plate with respect to an axis substantially normal to the second plate. When viewed from above the second plate, the conductive coil may include an outer periphery and an inner periphery that forms an inner space. The second plate may include a conductive plate that forms a large portion of the second plate, a first non-conductive portion formed through the conductive plate and having a size and shape corresponding to the size and shape of the inner space of the coil when viewed from above the second plate, the first non-conductive portion facing the inner space of the coil, a second non-conductive portion formed through the conductive plate and extending from a portion of an edge of the conductive plate toward the first non-conductive portion so as not to overlap the first non-conductive portion when viewed from above the second plate, a first non-conductive slit formed through the conductive plate and extending from a first part of the second non-conductive portion to the first non-conductive portion when viewed from above the second plate, a second non-conductive slit formed through the conductive plate and extending from a second part of the second non-conductive portion to a first point within the coil when viewed from above the second plate, and a third non-conductive slit formed through the conductive plate and extending from a third part of the second non-conductive portion to a second point within the coil when viewed from above the second plate. A first point of the second non-conductive portion may be located between second and third points of the second non-conductive portion when viewed from above the second plate. The first non-conductive slit may extend between the second non-conductive slit and the third non-conductive slit when viewed from above the second plate.

According to embodiments of the present disclosure, it is possible to enhance the efficiency of wireless charging or magnetic field communication by changing the direction of eddy current using a plurality of slits formed in a rear cover.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
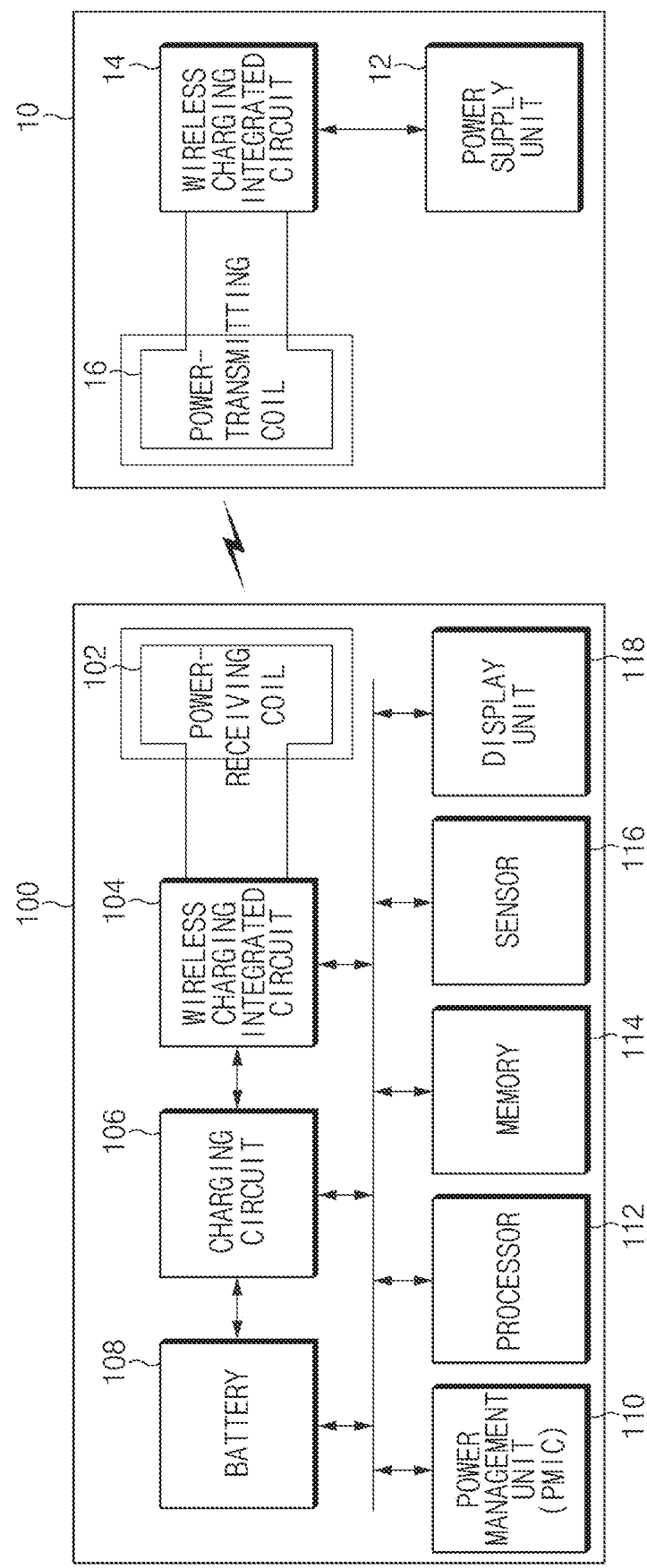
FIG. 1 is a block diagram of a power supply device and an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram of a power supply device 10 and an electronic device 100 according to an embodiment of the present disclosure.

Referring to FIG. 1, the power supply device 10 may include a power supply unit 12, a wireless charging integrated-circuit (IC) 14, and a power-transmitting coil 16.

According to an embodiment, the power supply unit 12 may receive power from an adaptor and may transfer the received power to the wireless charging integrated-circuit 14. The power supply unit 12 may adjust the amount of power to be transferred to the wireless charging integrated-circuit 14.

According to an embodiment, the wireless charging integrated-circuit 14 may include a power amplifier (PA), a matching circuit, and a communication circuit. The PA may amplify the power received from the power supply unit 12 with a set gain and may output the amplified power to the matching circuit. The matching circuit may perform impedance matching. For example, the matching circuit may include one or more coils and capacitors and may perform impedance matching by controlling the connection state of the coils and the capacitors. The matching circuit may increase charging efficiency by performing the impedance matching. The communication circuit may communicate with a communication circuit included in the electronic device 100. For example, the communication circuit may perform two-way communication (e.g., Wireless Fidelity (Wi-Fi), ZigBee, or Bluetooth/Bluetooth low energy (BT/BLE)) with a frequency of 2.4 GHz.

According to an embodiment, the power-transmitting coil 16 may transmit the power received through the wireless charging integrated-circuit 14 to a power-receiving coil 102. For example, the power-transmitting coil 16 may transmit the power to the power-receiving coil 102 using a frequency band of 100 to 205 KHz (WPC type), a frequency band of 277 to 357 KHz (PMA type), or a frequency band of 6.78 MHz (A4WP type). In this disclosure, the frequency band in which the power-transmitting coil 16 transmits power to the power-receiving coil 102 may be the same as (in-band type) or different from (out-band type) the frequency band in which the communication circuits communicate with each other.

Referring to FIG. 1, the electronic device 100 may include the power-receiving coil 102, a wireless charging integrated-circuit 104 (or a power management circuit), a charging circuit 106, a battery 108, a power management unit 110, a processor 112, a memory 114, a sensor 116, and a display unit 118.

According to an embodiment, the power-receiving coil 102 may wirelessly receive power supplied by the power supply device 10 and may transfer the received power to the wireless charging integrated-circuit 104. For example, the power-receiving coil 102 may acquire power induced by the power-transmitting coil 16 and may transfer the acquired power to the wireless charging integrated-circuit 104.

According to an embodiment, the wireless charging integrated-circuit 104 may include a rectifier circuit, a smoothing circuit, a communication circuit, and/or an overvoltage protection circuit. The rectifier circuit may be implemented in the form of a bridge diode and may rectify the power received from the power-receiving coil 102. The smoothing circuit may convert the rectified power with a set gain. For example, the smoothing circuit may convert the rectified power such that an output terminal to which the wireless charging integrated-circuit 104 and the charging circuit 106 are connected has a voltage of 5 V.

According to an embodiment, the communication circuit may communicate with the power supply device 10 through a predetermined method. The communication circuit may communicate with the power supply device 10 using near field communication (NFC), ZigBee communication, infrared communication, Bluetooth communication, BLE communication, or the like. The aforementioned communication methods are merely illustrative, and the scope of embodiments of the present disclosure is not limited to a specific communication method performed by the communication circuit.

According to an embodiment, the communication circuit may transmit first power information to the power supply device 10. The first power information may include at least one of the capacity of the battery 108, the remaining amount of charge of the battery 108, the number of times the battery 108 has been charged, and the amount of the used battery. The communication circuit may also receive second power information from the power supply device 10. The second power information may include information about power transmitted from the power supply device 10 to the electronic device 100 (e.g., the amount of power, the frequency at which power is transmitted, or the like), charging control information (e.g., control information for stopping charging), information about an error occurring in the power supply device 10, or the like.

According to an embodiment, the overvoltage protection circuit may prevent overvoltage from being applied to the battery 108. For example, the overvoltage protection circuit may determine the amount of charge of the battery 108 through the sensor 116 and may interrupt voltage (or current) applied to the battery 108 if the battery 108 is completely charged. The overvoltage protection circuit may also interrupt voltage applied to the battery 108 if receiving information about an error occurring in the power supply device 10 through the communication circuit.

According to an embodiment, the charging circuit 106 may be disposed between the battery 108 and the wireless charging integrated-circuit 104. The charging circuit 106 may charge the battery 108 using power converted by the smoothing circuit. The charging circuit 106 may stop charging the battery 108 under the control of the overvoltage protection circuit while the battery is being charged.

According to an embodiment, the battery 108 may convert chemical energy into electrical energy, and vice versa. For example, the battery 108 may convert electrical energy received from the power supply device 10 by the power-receiving coil 102 into chemical energy and may store the chemical energy. The electrical energy received from the power supply device 10 by the power-receiving coil 102 may be rectified in the wireless charging integrated-circuit 104 and then transferred to the battery 108. The battery 108 may convert chemical energy into electrical energy and may supply the converted electrical energy to the display unit 118 and various electronic components or modules mounted on a printed circuit board (PCB).

According to an embodiment, the power management unit 110 may control charging modes (e.g., a fast charging mode, a general charging mode, and the like) for the battery 108. For example, the power management unit 110 may perform fast charging or general charging on the battery 108 according to the state of the power supply device 10 and the electronic device 100.

According to an embodiment, the processor 112 may control all of the operations of the electronic device 100. For example, the processor 112 may control all of the operations of the electronic device 100 using algorithms, programs, or applications stored in the memory 114. The processor 112 may be implemented in the form of an application processor, a central processing unit, or a microprocessor.

According to an embodiment, the display unit 118 may display the state of the power supply device 10 and the electronic device 100. For example, the display unit 118 may display the amount of charge of the battery 108, information as to whether an adaptor is inserted, information about an error occurring in the power supply device 10, or the like. The display unit 118 may be referred to as a display.

Figure 2A:
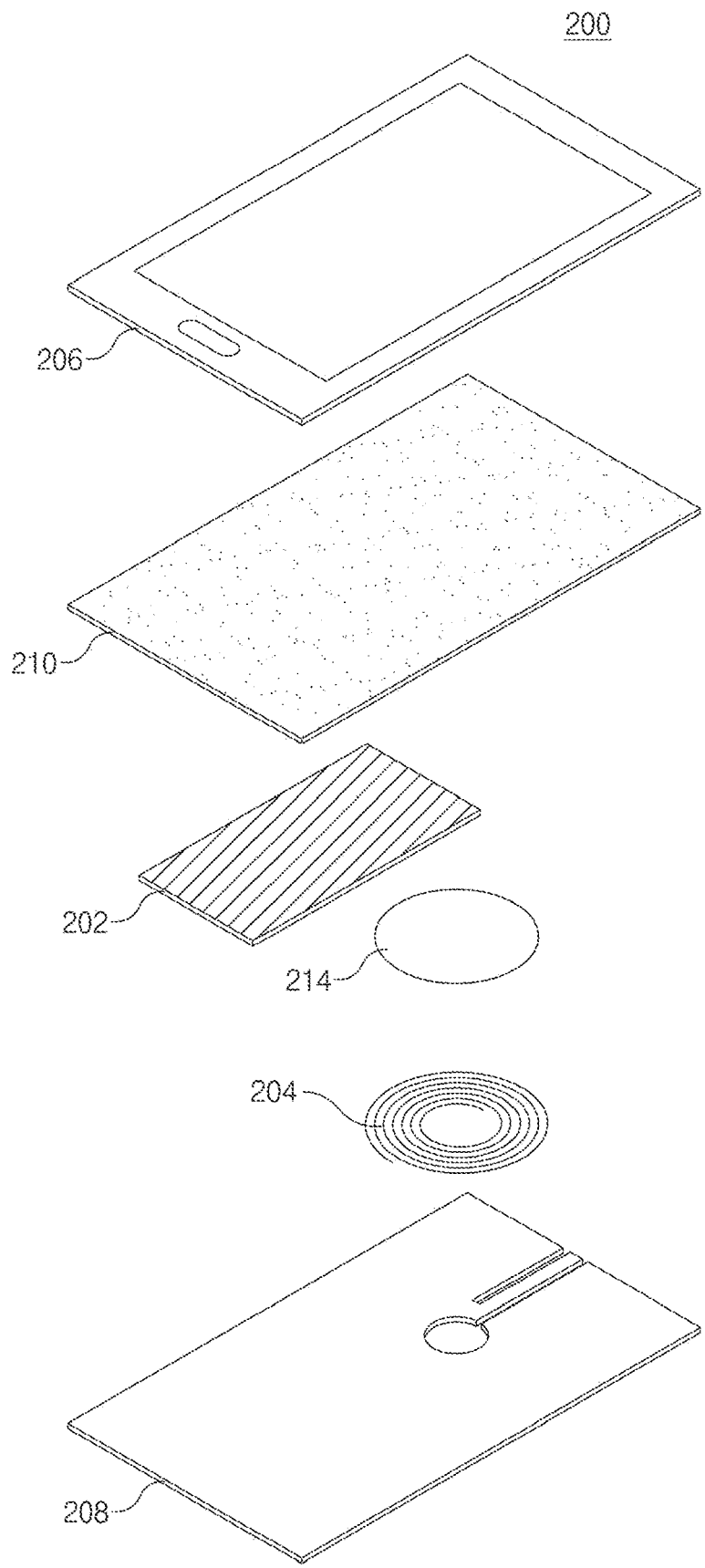
FIG. 2A is an exploded perspective view of an electronic device according to an embodiment of the present disclosure.

FIG. 2A is an exploded perspective view of an electronic device 200 according to an embodiment of the present disclosure.

Figure 2B:
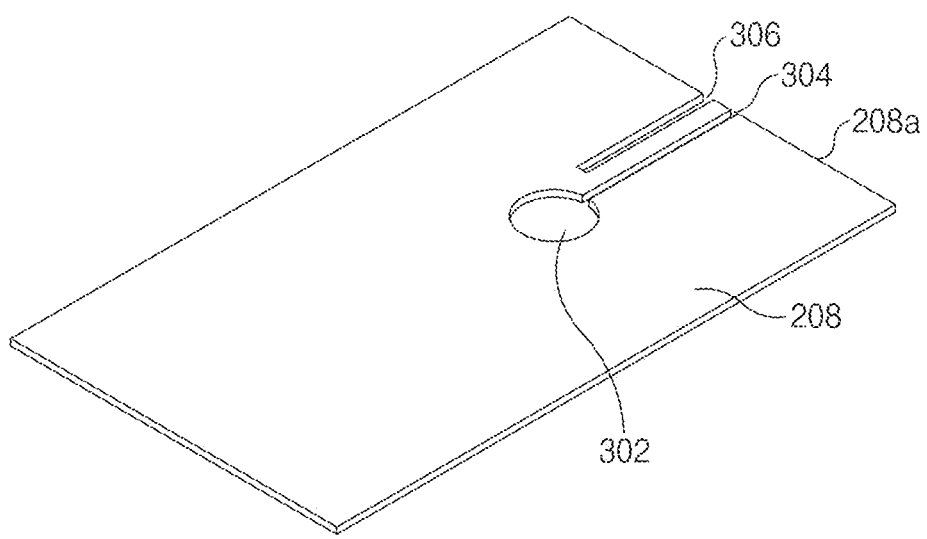
FIG. 2B illustrates a rear cover of the electronic device according to an embodiment of the present disclosure.

FIG. 2B illustrates a rear cover 208 of the electronic device 200 according to an embodiment of the present disclosure.

Figure 2C:
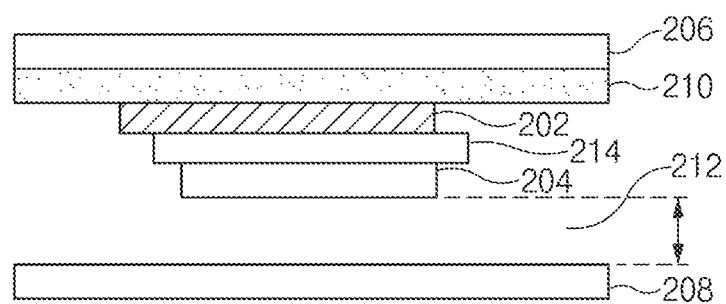
FIG. 2C is a sectional view of the electronic device according to an embodiment of the present disclosure.

FIG. 2C is a sectional view of the electronic device 200 according to an embodiment of the present disclosure.

Figure 2D:
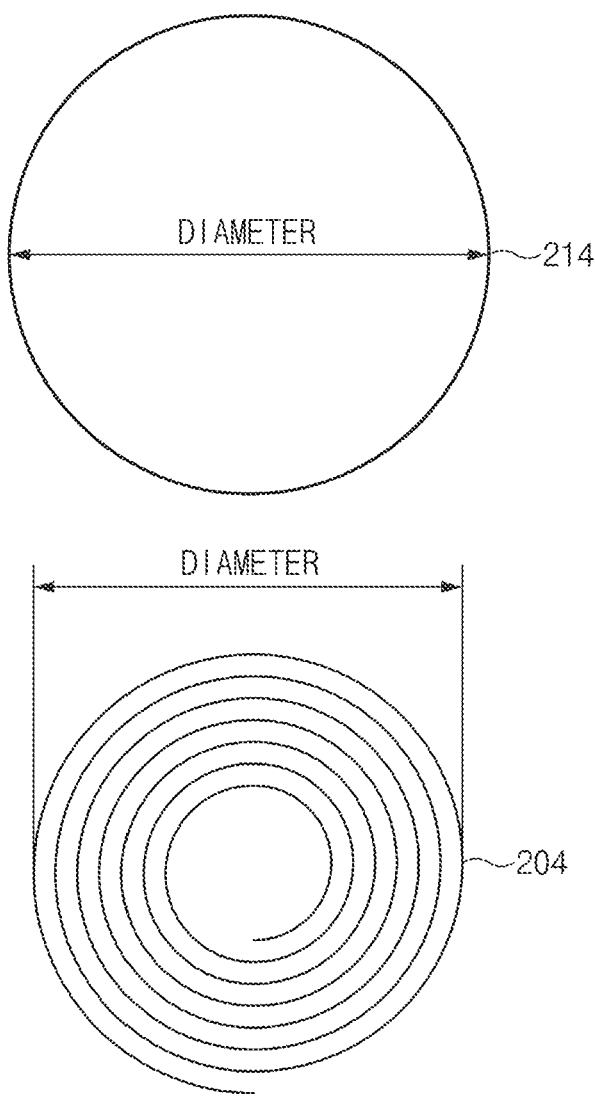
FIG. 2D illustrates a ferrite and a first coil according to an embodiment of the present disclosure.

FIG. 2D illustrates a ferrite 214 and a first coil 204 according to an embodiment of the present disclosure.

In this disclosure, the foregoing descriptions set forth in conjunction with FIG. 1 may be identically applied to elements having the same reference numerals as those of the elements of the electronic device 100 and the power supply device 10 illustrated in FIG. 1. For example, the electronic device 200 of FIG. 2A may correspond to a hardware structure of the electronic device 100 of FIG. 1. A battery 202 and the first coil 204 of FIG. 2A may correspond to the battery 108 and the power-receiving coil 102 of FIG. 1, respectively. In this disclosure, a direction (e.g., a first direction, a second direction, a third direction, or a fourth direction) may be any direction on the rear cover 208.

Referring to FIGS. 2A to 2D, the electronic device 200 may include a housing, a support member 210, the first coil 204, and the ferrite 214.

Referring to FIG. 2A, the housing may include a front cover 206 (or a first plate) and the rear cover 208 (or a second plate). The housing may include a side member that surrounds space between the front cover 206 and the rear cover 208. At least part of the front cover 206 may include glass. The glass may transmit light generated by a display. A user may perform a touch (including contact using an electronic pen) by touching the glass with a part of his/her body (e.g., a finger). The glass may be formed of, for example, reinforced glass, reinforced plastic, a flexible polymer material, or the like to protect the display and elements included in the electronic device 200 from an external shock.

Referring to FIG. 2B, the rear cover 208 may include a conductive member (e.g., a conductive plate that forms a large portion of the rear cover 208). For example, a region of the rear cover 208 may include a conductive member, and a region of the rear cover 208 may include a non-conductive member (e.g., a plastic injection-molded material).

According to an embodiment, the rear cover 208 may have a hole 302 and a plurality of slits 304 and 306 formed therein. The size and shape of the hole 302 may be the same as or correspond to the size and shape of a space formed inside the first coil 204. When viewed from above the rear cover 208, the hole 302 and the first coil 204 may have a common axis. While the single hole 302 is illustrated in FIG. 2B, the rear cover 208 may have two or more holes 302. For example, in the case where the electronic device 200 includes two coils, two holes 302 may be formed in the rear cover 208 depending on the positions of the coils.

According to an embodiment, the slits 304 and 306 may be gaps formed in the rear cover 208. For example, the slits 304 and 306 may be non-conductive portions included in the rear cover 208. While the slits 304 and 306 in FIG. 2B are formed perpendicular to an edge 208a of the rear cover 208, the slits 304 and 306 may be formed parallel to the edge 208a of the rear cover 208 or may be formed to be oblique with respect to the edge 208a of the rear cover 208. For example, the shapes of the slits 304 and 306 may be the same as or different from each other. While the two slits 304 and 306 are illustrated in FIG. 2B, the rear cover 208 may have three or more slits 304 and 306. For example, a non-conductive member (e.g., a plastic injection-molded material having substantially the same color and gloss as those of the rear cover 208) may be disposed in the hole 302 and the slits 304 and 306.

Referring to FIG. 2C, the support member 210 may be coupled with the display and a PCB to physically support elements of the electronic device 200. The battery 202 may be disposed below the support member 210 to supply power to the electronic device 200. While FIG. 2C illustrates that the battery 202 is disposed below the support member 210, the battery 202 may be disposed on the support member 210.

According to an embodiment, the electronic device 200 may include at least one coil. For example, the electronic device 200 may include the first coil 204 or a second coil (not illustrated). A gap 212 may be between the first coil 204 and the rear cover 208. The first coil 204 may be a power-receiving coil for wirelessly receiving power from an external device, or may be a power-transmitting coil for transmitting power to the external device. The first coil 204 may also be a communication coil for transmitting/receiving a signal in a specified frequency band with the external device. Alternatively, the first coil 204 may be a coil for magnetic secure transmission. For example, a non-conductive member (e.g., a plastic injection-molded material) may be disposed in the gap 212.

According to an embodiment, the first coil 204 may be wound on a plane parallel to the rear cover 208 with respect to an axis substantially normal to the rear cover 208. When viewed from above the rear cover 208, the first coil 204 may include an outer periphery and an inner periphery that form an inner space.

Referring to FIGS. 2C and 2D, the ferrite 214 may be disposed between the battery 202 and the first coil 204. The ferrite 214 may shield noise generated by the elements (e.g., the display and the battery 202) that are disposed above the first coil 204. For example, the ferrite 214 may shield electromagnetic waves generated by the display and/or the battery 202.

According to an embodiment, the size of the ferrite 214 may be the same as or larger than the size of the first coil 204. For example, in the case where the ferrite 214 and the first coil 204 have a circular shape, the ferrite 214 may have a diameter of 40 mm, and the first coil 204 may have a diameter of 40 mm or 39 mm. The shape of the ferrite 214 may be the same as, or different from, the shape of the first coil 204. While FIG. 2D illustrates that the ferrite 214 and the first coil 204 have a circular shape, the shape of the ferrite 214 and the shape of the first coil 204 are not limited thereto.

According to an embodiment, the first coil 204 may have a shape in which a wire is wound around a space formed inside. According to an embodiment, the first coil 204 may have a shape in which a wire is wound several times around a space formed inside. The performance of the first coil 204 may vary depending on the number of turns of the wire. An empty space may or may not be present between the wires. While FIG. 2D illustrates that the first coil 204 has a shape in which a wire is wound around a space formed inside, the shape of the first coil 204 is not limited to that illustrated in FIG. 2D. For example, the first coil 204 may have a shape in which a wire is wound to surround a circular cylinder.

According to an embodiment, although not illustrated in FIGS. 2A to 2D, the electronic device 200 may include a second coil and a camera module. The second coil may at least one of transmit or receive a signal in a specified frequency band with an external device. For example, the second coil may be used for near field communication that uses a frequency band of 13.56 MHz. Alternatively, the second coil may be used for magnetic secure transmission. The camera module may be disposed in the housing and may take an image through the hole 302 of the rear cover 208.

Figure 3A:
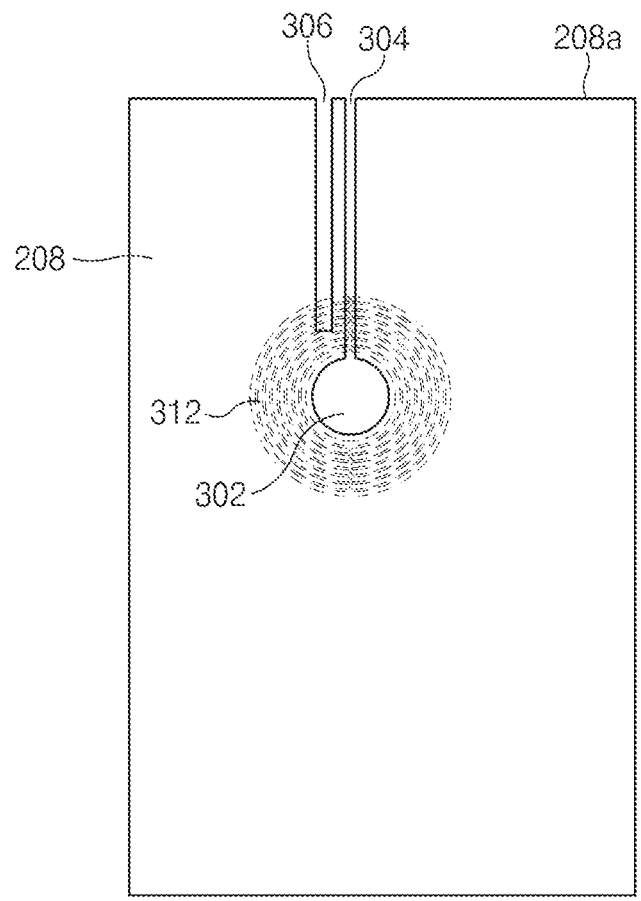
FIG. 3A illustrates a rear cover that includes a first slit and a second slit according to an embodiment of the present disclosure.

FIG. 3A illustrates the rear cover 208 that includes the first slit 304 and the second slit 306 according to an embodiment of the present disclosure.

Figure 3B:
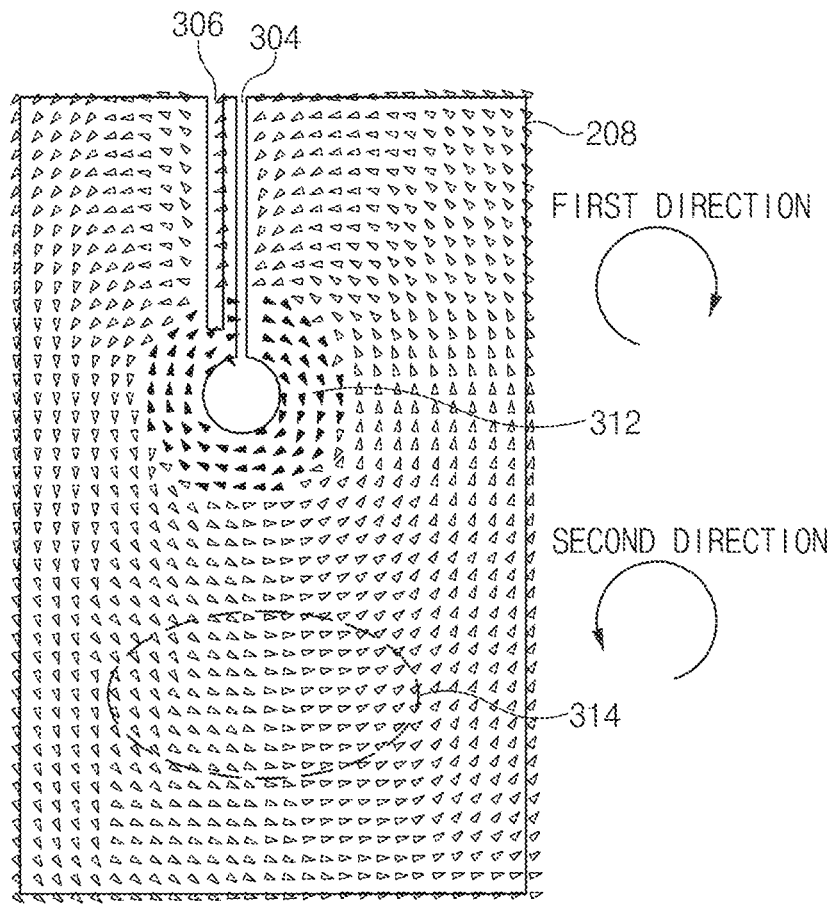
FIG. 3B illustrates currents flowing in the rear cover that includes the first slit and the second slit according to an embodiment of the present disclosure.

FIG. 3B illustrates currents flowing in the rear cover 208 that includes the first slit 304 and the second slit 306 according to an embodiment of the present disclosure. In this disclosure, the slits may be referred to as non-conductive slits.

Referring to FIG. 3A, the rear cover 208 may include the hole 302 (or a non-conductive portion) in a first region thereof. The first region may be a region of the rear cover 208 that corresponds to the space formed inside the first coil 204. For example, the size and shape of the hole 302 may be substantially the same as the size and shape of the space formed inside the first coil 204. Alternatively, the size of the hole 302 may be smaller than the size of the space formed inside the first coil 204.

According to an embodiment, the rear cover 208 may include the first slit 304 and the second slit 306. The first slit 304 may be, for example, a gap extending from the edge 208a of the rear cover 208 to the hole 302. The edge 208a of the rear cover 208 may include a portion of the outer periphery of the rear cover 208. For example, in the case where the rear cover 208 has a rectangular shape, the edge 208a may be any one of the four sides of the rear cover 208. The second slit 306 may be, for example, a gap spaced apart from the first slit 304 and extending from the edge 208a to a second region 312. One end of the second slit 306 may be located in the second region 312, and the other end of the second slit 306 may be located at the edge 208a of the rear cover 208. When viewed from above the rear cover 208, the second region 312 may be a region where the rear cover 208 and the first coil 204 overlap each other. According to an embodiment, the second region 312 may be formed in a position of the rear cover 208 that corresponds to the position of the first coil 204.

According to an embodiment, the first slit 304 and the second slit 306 may not be parallel to each other. The first slit 304 and the second slit 306 may be formed to be oblique with respect to the edge 208a. The first slit 304 may have the same width as the second slit 306.

Referring to FIG. 3B, if a current flows in the first coil 204 in a second direction, eddy current may flow in the second region 312 in a first direction. The eddy current flowing in the first direction may be directed toward the second direction in the vicinity of the first slit 304 and the second slit 306. If the eddy current is directed toward the second direction, the direction of the eddy current may be substantially the same as the direction of the current flowing in the first coil 204 in the remaining region other than the second region 312. For example, the direction of the eddy current in a region 314 may be the same as the direction of the current of the first coil 204. Since the eddy current directed toward the second direction and the current in the first coil 204 flow in the same direction, the direction of a magnetic field induced by the eddy current may be substantially the same as the direction of a magnetic field induced by the first coil 204.

According to an embodiment, the magnetic field induced by the eddy current directed toward the second direction may increase the amount of current flowing in the first coil 204. For example, the wireless charging integrated-circuit 104 may charge the battery 202 using the increased current. According to an embodiment of the present disclosure, charging efficiency of the battery 202 may be enhanced by charging the battery 202 by increasing the amount of current flowing in the first coil 204.

According to an embodiment, the eddy current directed toward the second direction in the vicinity of the first slit 304 and the second slit 306 may decrease the amount of eddy current flowing in the first direction. For example, if the amount of eddy current flowing in the first direction decreases, magnetic field offsetting due to the eddy current may also decrease, and thus charging efficiency of the battery 202 or communication efficiency may be enhanced.

In this disclosure, the direction of the current flowing in the first coil 204 is illustrated as the second direction and the direction of the eddy current flowing in the second region 312 is illustrated as the first direction, and vice versa.

Figure 4A:
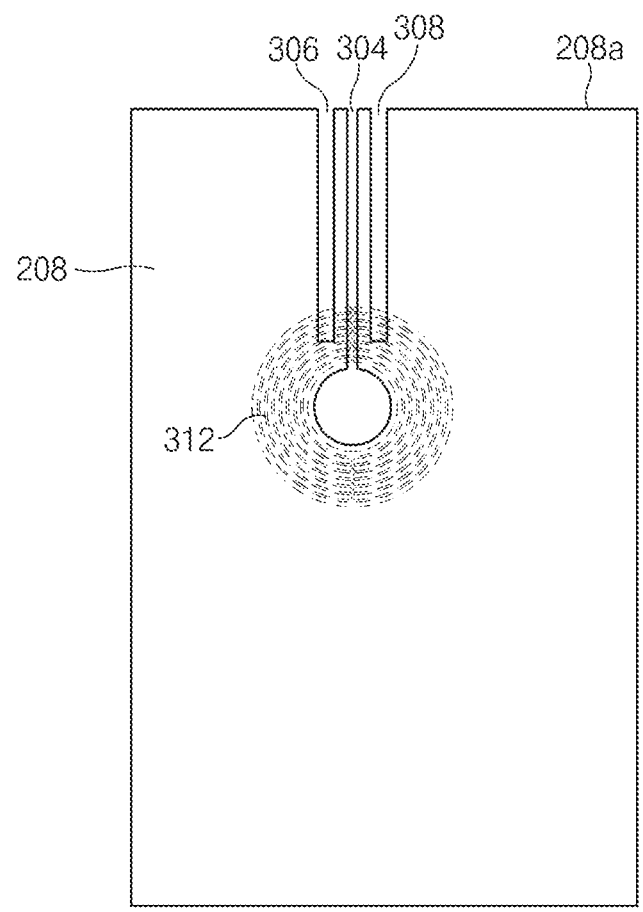
FIG. 4A illustrates a rear cover that includes a first slit, a second slit, and a third slit according to an embodiment of the present disclosure.

FIG. 4A illustrates the rear cover 208 that includes the first slit 304, the second slit 306, and a third slit 308 according to an embodiment of the present disclosure.

Figure 4B:
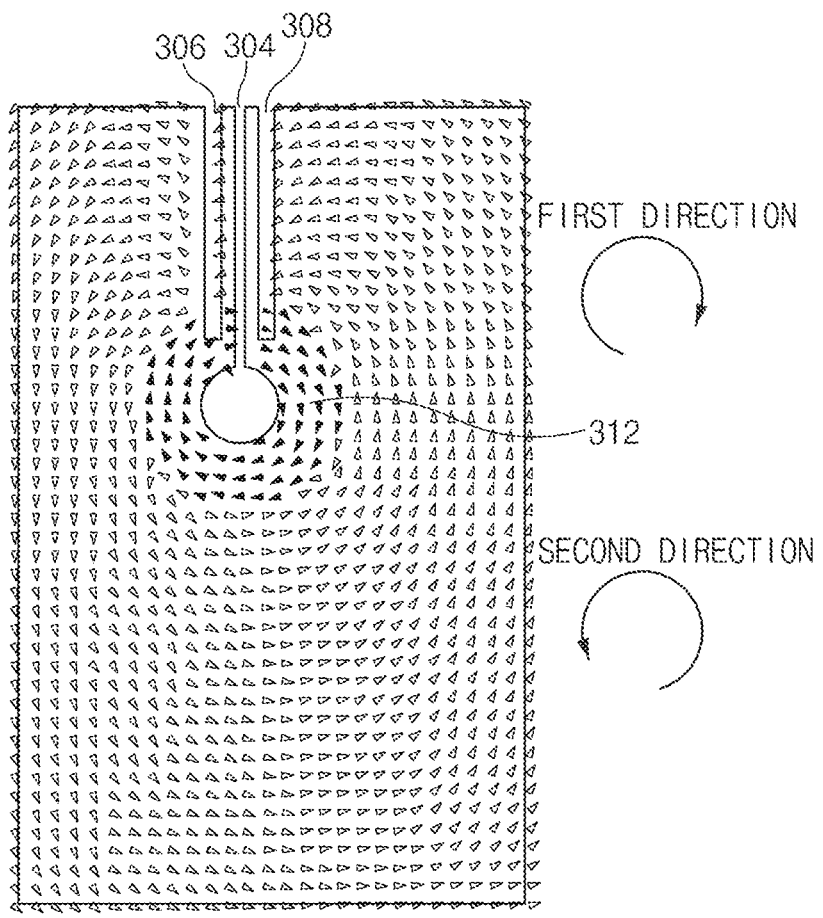
FIG. 4B illustrates currents flowing in the rear cover that includes the first slit, the second slit, and the third slit, according to an embodiment of the present disclosure.

FIG. 4B illustrates currents flowing in the rear cover 208 that includes the first slit 304, the second slit 306, and the third slit 308 according to an embodiment of the present disclosure.

Referring to FIG. 4A, the rear cover 208 according to an embodiment may include the first slit 304, the second slit 306, and the third slit 308. The third slit 308 may be a gap spaced apart from the first slit 304 and extending from the edge 208a of the rear cover 208. The third slit 308 may be disposed on the opposite side to the second slit 306 with respect to the first slit 304. When viewed from above the rear cover 208, at least part of the third slit 308 may overlap the first coil 204. The separation distance between the first slit 304 and the third slit 308 may be substantially the same as the separation distance between the first slit 304 and the second slit 306.

Referring to FIG. 4B, if a current flows in the first coil 204 in a second direction, eddy current may flow in the second region 312 in a first direction. The eddy current flowing in the first direction may be directed toward the second direction in the vicinity of the first slit 304, the second slit 306, and the third slit 308.

According to an embodiment, the eddy current directed toward the second direction in the vicinity of the first slit 304, the second slit 306, and the third slit 308 may decrease the amount of eddy current flowing in the first direction. If the amount of eddy current flowing in the first direction decreases, magnetic field offsetting due to the eddy current may also decrease, and thus charging efficiency of the battery 202 or communication efficiency may be enhanced.

Figure 5:
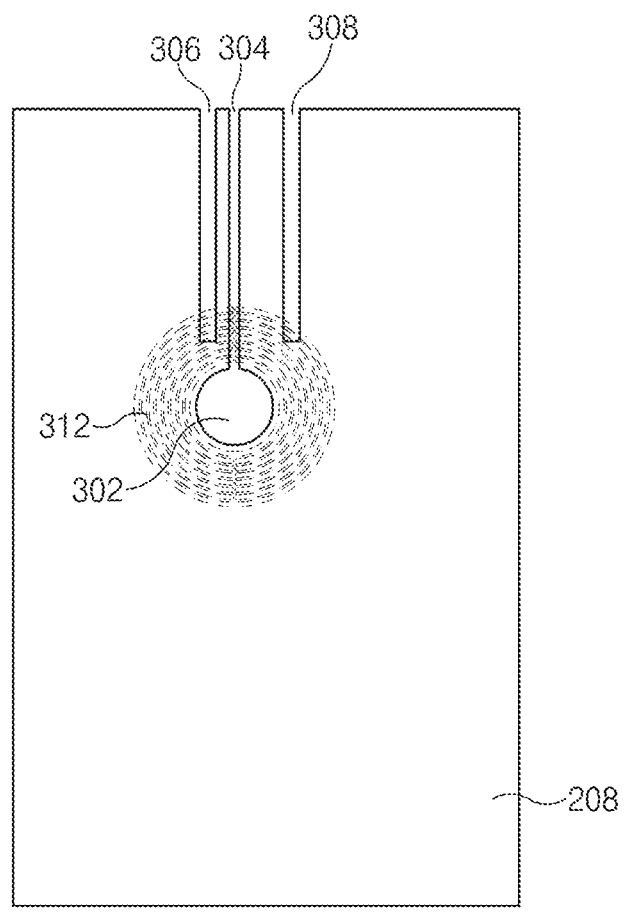
FIG. 5 illustrates a rear cover that includes a first slit, a second slit, and a third slit, where the separation distance between the first and second slits differs from the separation distance between the first and third slits according to an embodiment of the present disclosure.

FIG. 5 illustrates the rear cover 208 that includes the first slit 304, the second slit 306, and the third slit 308, where the separation distance between the first slit 304 and the second slit 306 differs from the separation distance between the first slit 304 and the third slit 308, according to an embodiment of the present disclosure. Embodiments illustrated in FIGS. 5 to 11 are other embodiments of the rear cover 208 illustrated in FIG. 4A.

Referring to FIG. 5, the separation distance between the first slit 304 and the third slit 308 may be different from the separation distance between the first slit 304 and the second slit 306. For example, the separation distance between the first slit 304 and the third slit 308 may be longer or shorter than the separation distance between the first slit 304 and the second slit 306. In the case where the separation distance between the first slit 304 and the third slit 308 is longer than the separation distance between the first slit 304 and the second slit 306, the third slit 308 may have no portion overlapping the second region 312. Communication efficiency or charging efficiency of the battery 202 may vary depending on the separation distance between the first slit 304 and the third slit 308.

According to an embodiment of the present disclosure, the first slit 304, the second slit 306, and the third slit 308 may be parallel to one another. In the case where the first slit 304, the second slit 306, and the third slit 308 are parallel to one another, one end of the first slit 304, one end of the second slit 306, and one end of the third slit 308 may be located in the second region 312. According to an embodiment, the first slit 304, the second slit 306, and the third slit 308 may not be parallel to one another. For example, the first slit 304 and the second slit 306 may be parallel to each other, but the third slit 308 may not be parallel to the first slit 304 and the second slit 306. According to another embodiment, the first slit 304, the second slit 306, and the third slit 308 may not all be parallel to one another. In the case where the first slit 304, the second slit 306, and the third slit 308 are not parallel to one another, one end of the first slit 304, one end of the second slit 306, and/or one end of the third slit 308 may be located inside the second region 312, or may be located outside the second region 312.

Figure 6:
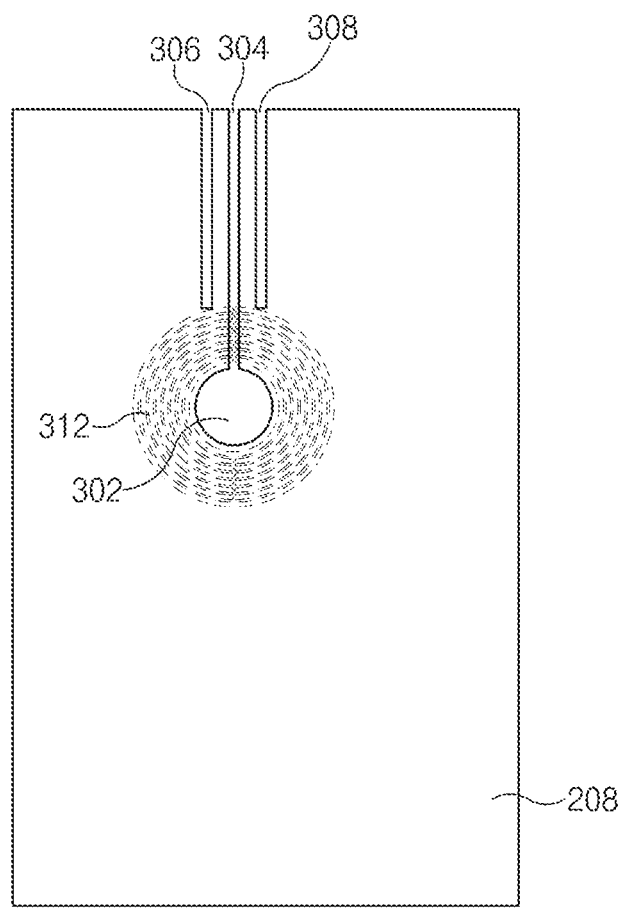
FIG. 6 illustrates a rear cover in which one end of a second slit and one end of a third slit are located at the outer periphery of a second region according to an embodiment of the present disclosure.

FIG. 6 illustrates the rear cover 208 in which one end of the second slit 306 and one end of the third slit 308 are located at the outer periphery of the second region 312 according to an embodiment of the present disclosure. In this disclosure, an outer diameter (or an outer periphery) may correspond to the diameter of a circle farthest away from the hole 302 in the second region 312, and an inner diameter (or an inner periphery) may correspond to the diameter of the hole 302.

Referring to FIG. 6, one end of the second slit 306 and one end of the third slit 308 may be located adjacent to the outer periphery of the second region 312. The separation distance between the first slit 304 and the second slit 306 may be different from the separation distance between the first slit 304 and the third slit 308. For example, the one end of the second slit 306 may be located adjacent to the outer periphery of the second region 312, and the length of the second slit 306 may decrease along the curved outer periphery of the second region 312 as the second slit 306 approaches the first slit 304. The one end of the third slit 308 may be located adjacent to the outer periphery of the second region 312, and the length of the third slit 308 may increase along the curved outer periphery of the second region 312 as the third slit 308 moves far away from the first slit 304.

According to an embodiment, the one end of the second slit 306 and the one end of the third slit 308 may be located adjacent to the inner periphery of the second region 312.

Figure 7:
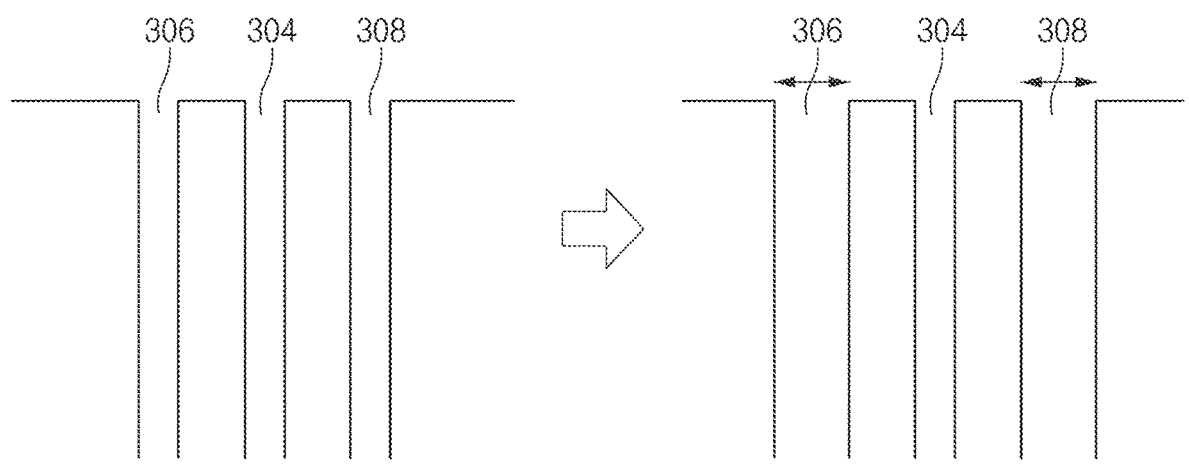
FIG. 7 illustrates second and third slits having a wide width according to an embodiment of the present disclosure.

FIG. 7 illustrates the second and third slits 306 and 308 having a wide width according to an embodiment of the present disclosure.

Referring to FIG. 7, the widths of the second and third slits 306 and 308, according to an embodiment, may differ from the width of the first slit 304. For example, the second and third slits 306 and 308 may be wider or narrower than the first slit 304. For example, the second slit 306 may be wider or narrower than the third slit 308. Charging efficiency of the battery 202 or communication efficiency may vary depending on the widths of the second and third slits 306 and 308. For example, as the widths of the second and third slits 306 and 308 increase, the amount of eddy current, the direction of which changes, may increase, which results in an increase in the charging efficiency of the battery 202.

According to an embodiment, charging efficiency of the battery 202 or communication efficiency may also vary depending on the width of the first slit 304. For example, as the width of the first slit 304 increases, the amount of eddy current, the direction of which changes, may increase, which results in an increase in the charging efficiency of the battery 202.

Figure 8:
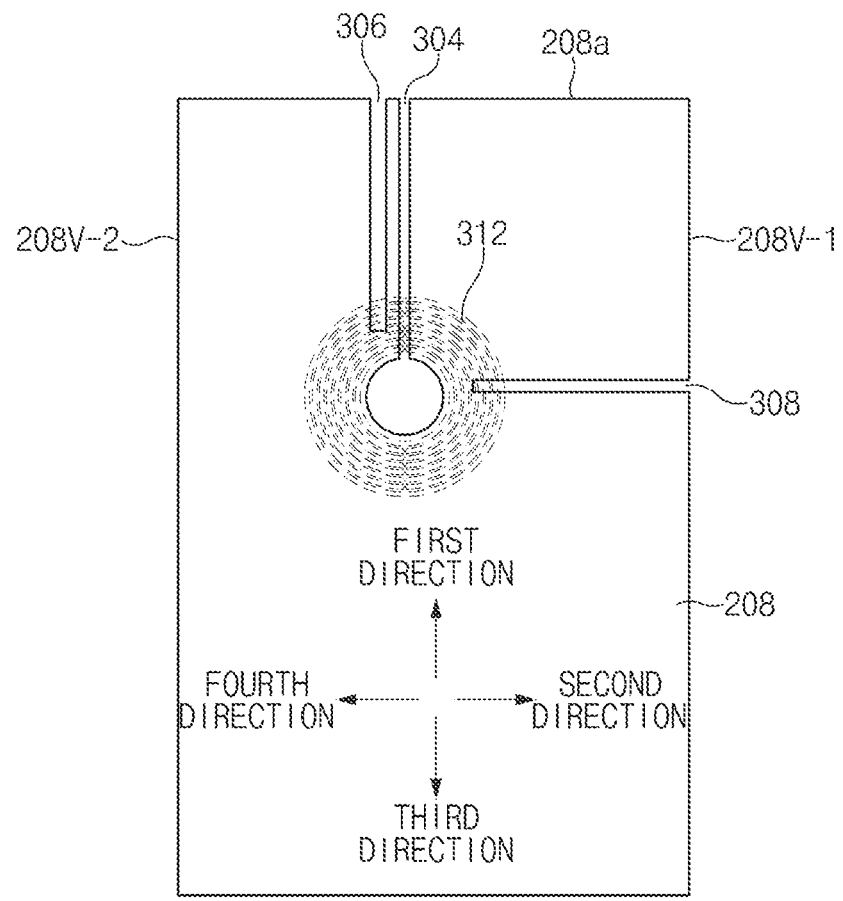
FIG. 8 illustrates a rear cover that includes a third slit extending from a vertical edge of the rear cover according to an embodiment of the present disclosure.

FIG. 8 illustrates the rear cover 208 that includes the third slit 308 extending from a vertical edge of the rear cover 208 according to an embodiment of the present disclosure.

Referring to FIG. 8, the third slit 308 according to an embodiment may extend from a vertical edge 208v-1 or 208v-2 perpendicular to the edge 208a of the rear cover 208. One end of the third slit 308 may be located in the second region 312. For example, the third slit 308 may extend from the vertical edge 208v-1 of the rear cover 208 in the fourth direction. Alternatively, the third slit 308 may extend from the vertical edge 208v-1 of the rear cover 208 in a direction between the third and fourth directions. In another case, the third slit 308 may extend from the vertical edge 208v-1 of the rear cover 208 in a direction between the first and fourth directions.

According to an embodiment, the third slit 308 may also extend from the vertical edge 208v-2 of the rear cover 208. In the case where the third slit 308 extends from the vertical edge 208v-2 of the rear cover 208, the third slit 308 may extend from the vertical edge 208v-2 in the second direction, in a direction between the first and second directions, or in a direction between the second and third directions.

Figure 9:
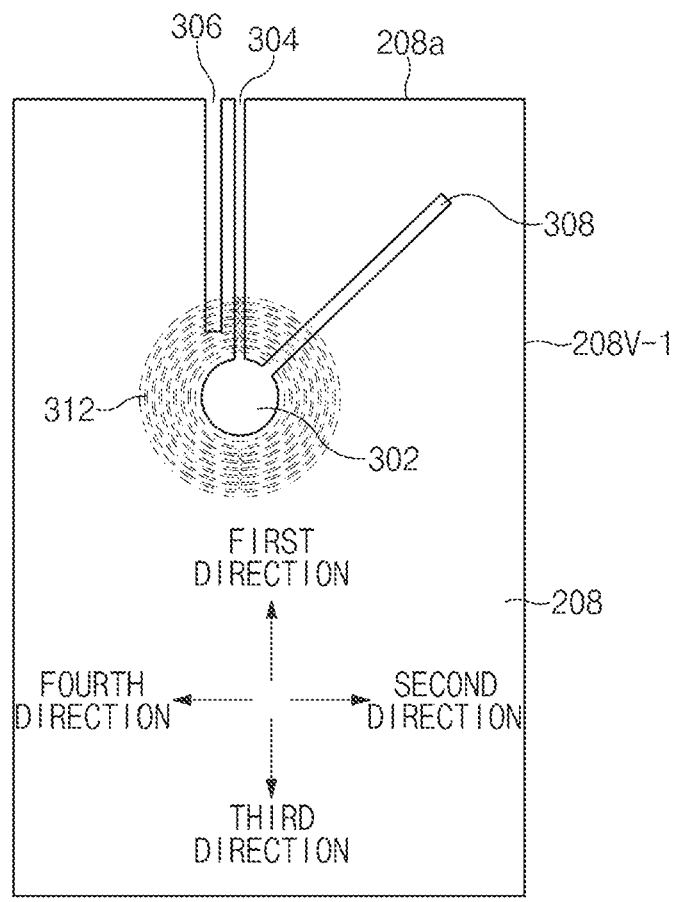
FIG. 9 illustrates a rear cover that includes a third slit extending from a hole according to an embodiment of the present disclosure.

FIG. 9 illustrates the rear cover 208 that includes the third slit 308 extending from the hole 302 according to an embodiment of the present disclosure.

Referring to FIG. 9, the third slit 308 according to an embodiment may extend from the hole 302 and may be spaced apart from the first slit 304. One end of the third slit 308 may be located in a third region. The third region may be the remaining region other than the second region 312 of the rear cover 208. While FIG. 9 illustrates that the third slit 308 extends in a direction between the first and second directions, the third slit 308 may extend in a direction between the second and third directions.

According to an embodiment of the present disclosure, the one end of the third slit 308 may be located on at least one edge (e.g., the edge 208a or 208v-1) of the rear cover 208. Charging efficiency of the battery 202 or communication efficiency may vary depending on whether the one end of the third slit 308 is located on the edge 208a or 208v-1 or in the third region.

Figure 10A:
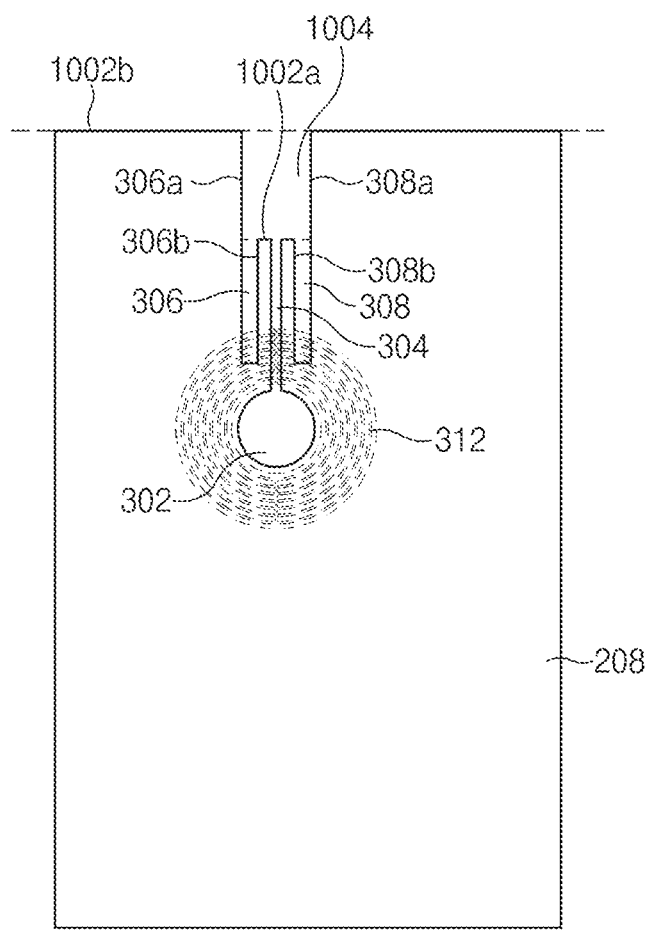
FIG. 10A illustrates a rear cover that includes a first slit disposed between a region of a second slit and a region of a third slit according to an embodiment of the present disclosure.

FIG. 10A illustrates the rear cover 208 that includes the first slit 304 disposed between a region of the second slit 306 and a region of the third slit 308 according to an embodiment of the present disclosure.

Figure 10B:
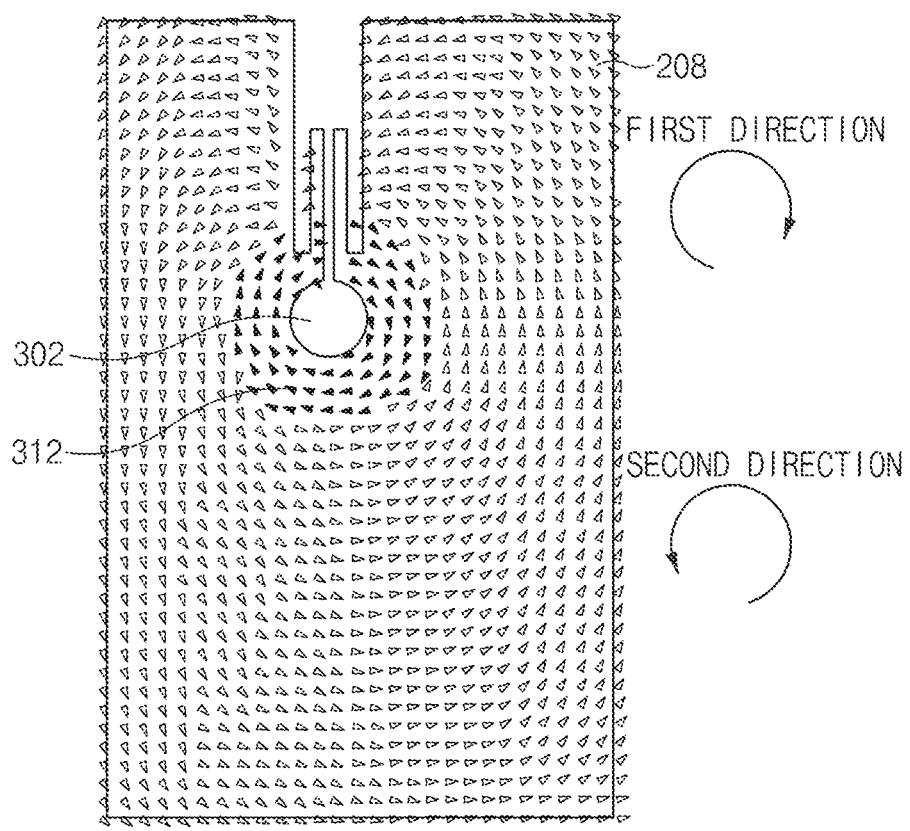
FIG. 10B illustrates currents flowing in the rear cover that includes the first slit disposed between the region of the second slit and the region of the third slit according to an embodiment of the present disclosure.

FIG. 10B illustrates currents flowing in the rear cover 208 that includes the first slit 304 disposed between the region of the second slit 306 and the region of the third slit 308 according to an embodiment of the present disclosure.

Referring to FIG. 10A, the rear cover 208 according to an embodiment may include the hole 302 (e.g., a first non-conductive portion), the first slit 304, the second slit 306, the third slit 308, and a non-conductive portion 1004 (e.g., a second non-conductive portion).

According to an embodiment, when viewed from above the rear cover 208, the non-conductive portion 1004 may extend toward the hole 302 from at least one edge (e.g., an edge 1002b) of the rear cover 208. The first slit 304 may extend from an edge 1002a of the rear cover 208 to the hole 302. Unlike the edge 208a of the rear cover 208 illustrated in FIGS. 2A through 9, the edge 1002a of the rear cover 208 may be located between the second slit 306 and the third slit 308. According to an embodiment, when viewed from above the rear cover 208, the first slit 304 may extend from a first portion (e.g., the edge 1002a) of the non-conductive portion 1004 to the hole 302.

According to an embodiment, the second slit 306 may be spaced apart from the first slit 304 and may be located in the second region 312. A first edge 306a of the second slit 306 may extend from the horizontal edge 1002b parallel to the edge 1002a of the rear cover 208. A second edge 306b of the second slit 306 may extend from the edge 1002a of the rear cover 208. According to an embodiment, when viewed from above the rear cover 208, the second slit 306 may extend from a second portion (e.g., the edge 1002b) of the non-conductive portion 1004 to a first point in the second region 312.

According to an embodiment, the third slit 308 may be spaced apart from the first slit 304 and may be disposed on the opposite side to the second slit 306 with respect to the first slit 304. A first edge 308a of the third slit 308 may extend from the horizontal edge 1002b of the rear cover 208. A second edge 308b of the third slit 308 may extend from the edge 1002a of the rear cover 208. According to an embodiment, when viewed from above the rear cover 208, the third slit 308 may extend from a third portion (e.g., the edge 1002b) of the non-conductive portion 1004 to a second point in the second region 312.

Referring to FIG. 10B, if a current flows in the first coil 204 in a second direction, eddy current may flow in the second region 312 in a first direction. The eddy current flowing in the first direction may be directed toward the second direction in the vicinity of the first slit 304, the second slit 306, and the third slit 308. The eddy current may be directed toward the second direction in the vicinity of a gap between the second slit 306 and the third slit 308 as well. For example, the eddy current may be directed toward the second direction between the first and second slits 304 and 306 or between the first and third slits 304 and 308.

According to an embodiment, the current directed toward the second direction in the vicinity of the first slit 304, the second slit 306, and the third slit 308 may decrease the amount of eddy current flowing in the first direction. If the amount of eddy current flowing in the first direction decreases, magnetic field offsetting due to the eddy current may also decrease, and thus charging efficiency of the battery 202 or communication efficiency may be enhanced.

Figure 11A:
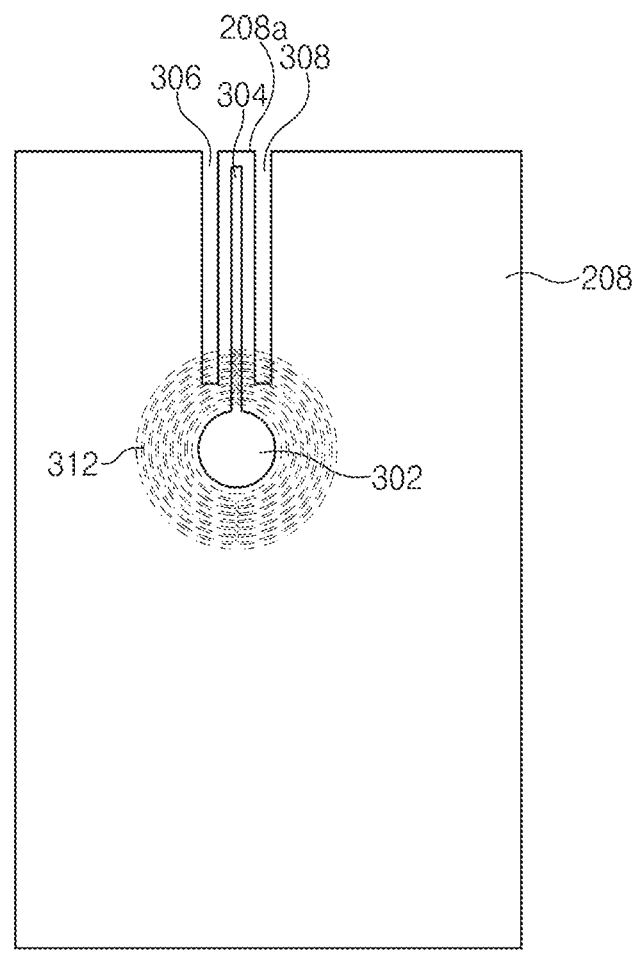
FIG. 11A illustrates a rear cover that includes a first slit extending from a hole and second and third slits extending from an edge according to an embodiment of the present disclosure.

FIG. 11A illustrates the rear cover 208 that includes the first slit 304 extending from the hole 302 and the second and third slits 306 and 308 extending from an edge according to an embodiment of the present disclosure.

Figure 11B:
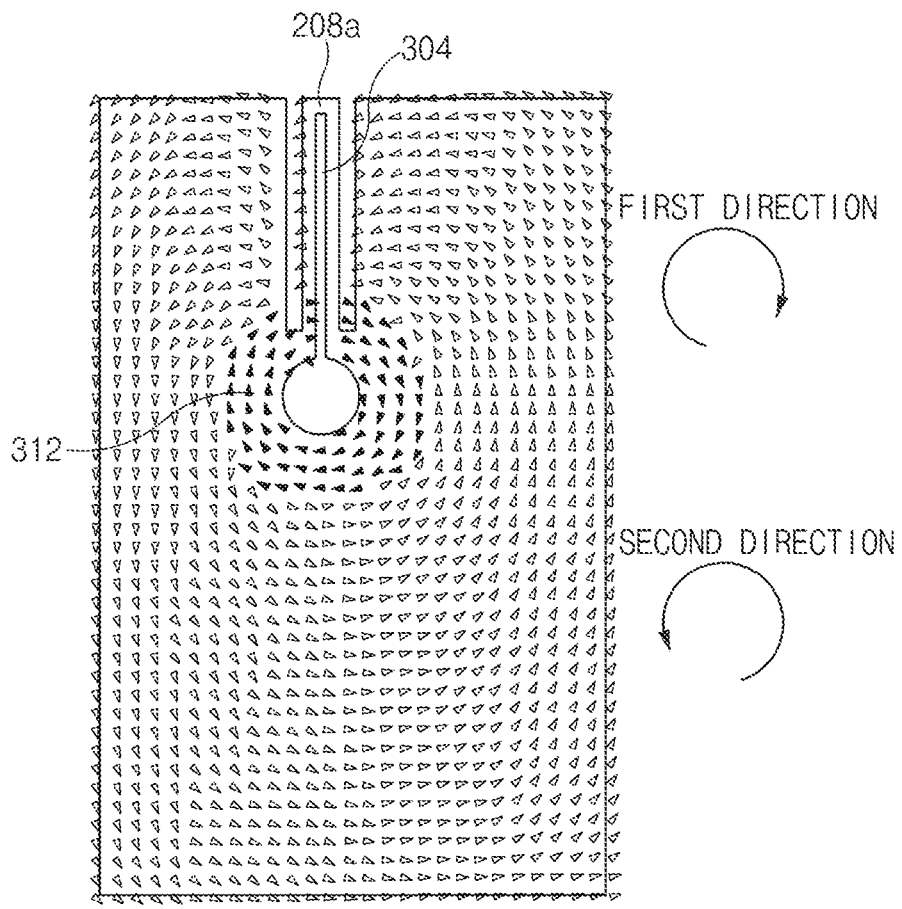
FIG. 11B illustrates currents flowing in the rear cover that includes the first slit extending from the hole and the second and third slits extending from the edge according to an embodiment of the present disclosure.

FIG. 11B illustrates currents flowing in the rear cover 208 that includes the first slit 304 extending from the hole 302 and the second and third slits 306 and 308 extending from the edge according to an embodiment of the present disclosure.

Referring to FIG. 11A, the first slit 304 according to an embodiment may extend from the hole 302, and one end of the first slit 304 may be located adjacent to at least one edge (e.g., the edge 208a) of the rear cover 208. For example, the one end of the first slit 304 may be located in a region between the edge 208a and the hole 302 of the rear cover 208.

According to an embodiment, the second slit 306 may be spaced apart from the first slit 304 and may extend from the edge 208a to a first point in the second region 312. The third slit 308 may be spaced apart from the first slit 304 and may extend from the edge 208a to a second point in the second region 312. The third slit 308 may be disposed on the opposite side to the second slit 306 with respect to the first slit 304.

Referring to FIG. 11B, if a current flows in the first coil 204 in a second direction, eddy current may flow in the second region 312 in a first direction. The eddy current flowing in the first direction may be directed toward the second direction in the vicinity of the first slit 304, the second slit 306, and the third slit 308. Since the one end of the first slit 304 is located adjacent to the edge 208a, the eddy current may be directed toward the second direction between the first slit 304 and the edge 208a as well. The eddy current may be directed toward the second direction between the first and second slits 304 and 306 and between the first and third slits 304 and 308.

According to an embodiment, the current directed toward the second direction in the vicinity of the first slit 304, the second slit 306, and the third slit 308 may decrease the amount of eddy current flowing in the first direction. If the amount of eddy current flowing in the first direction decreases, magnetic field offsetting due to the eddy current may also decrease, and thus charging efficiency of the battery 202 or communication efficiency may be enhanced.

Figure 12:
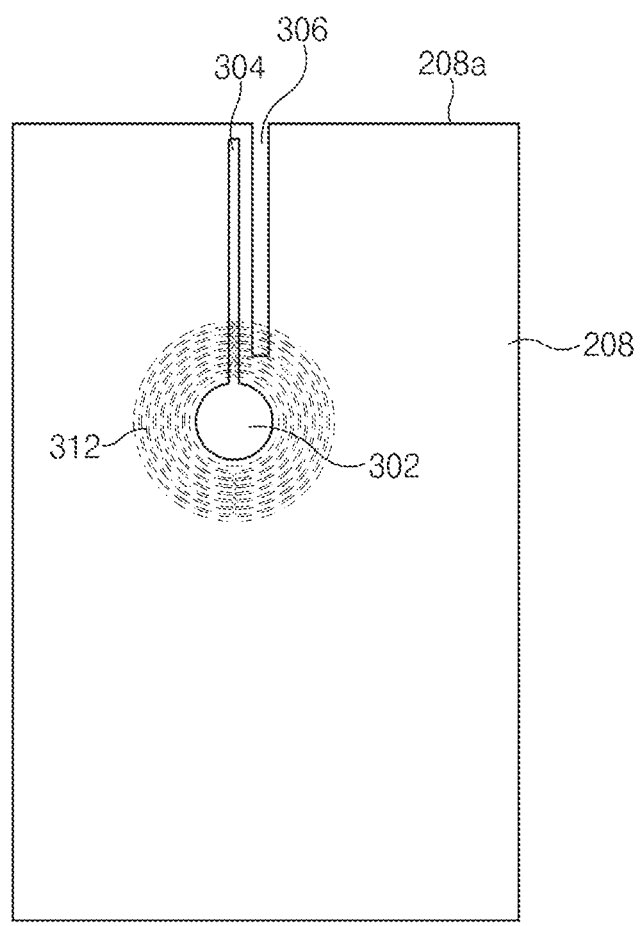
FIG. 12 illustrates a rear cover that includes a first slit extending from a hole and a second slit extending from an edge according to an embodiment of the present disclosure.

FIG. 12 illustrates the rear cover 208 that includes the first slit 304 extending from the hole 302 and the second slit 306 extending from an edge according to an embodiment of the present disclosure.

Referring to FIG. 12, the rear cover 208 according to an embodiment may include the hole 302, the first slit 304, and the second slit 306. The first slit 304 may extend from the hole 302. One end of the first slit 304 may be located adjacent to at least one edge 208*a* of the rear cover 208. The one end of the first slit 304 may be located in a region between the edge 208*a* and the hole 302 of the rear cover 208.

According to an embodiment, the second slit 306 may extend from the edge 208*a*, and one end of the second slit 306 may be located in the second region 312. The first slit 304 may be parallel to the second slit 306. Alternatively, the first slit 304 and the second slit 306 may not be parallel to each other. The first slit 304 may have the same width as the second slit 306. Alternatively, the first slit 304 may have a width different from the width of the second slit 306.

Although FIGS. 3A through 12 illustrate embodiments of decreasing the effect of eddy current when the electronic device receives power, the above descriptions may also be applied to the power supply device 10. For example, if the housing of the power supply device 10 has slits formed in a region thereof, the direction of eddy current flowing in the housing of the power supply device 10 may be the same as the direction of eddy current flowing in the power-transmitting coil. If the direction of the eddy current is the same as the direction of the eddy current flowing in the power-transmitting coil, magnetic field offsetting due to the eddy current may also decrease, and thus charging efficiency or communication efficiency of the power supply device 10 may be increased.

According to an embodiment of the present disclosure, an electronic device may include a housing and a first coil disposed in the housing and wound around a space formed inside. The housing may include a front cover and a rear cover. The rear cover may include a hole located in a first region of the rear cover that corresponds to the space of the first coil, a first slit that extended from an edge of the rear cover to the hole, and a second slit spaced apart from the first slit and extended from the edge. One end of the second slit may be located in a second region of the rear cover that corresponds to the first coil.

According to an embodiment of the present disclosure, the rear cover may further include a third slit spaced apart from the first slit and extended from the edge, and the third slit may be disposed on the opposite side to the second slit with respect to the first slit.

According to an embodiment of the present disclosure, one end of the third slit may be located in the second region.

According to an embodiment of the present disclosure, the one end of the second slit and one end of the third slit may be located at an outer periphery of the second region.

According to an embodiment of the present disclosure, the one end of the second slit and one end of the third slit may be located at an inner periphery of the second region.

According to an embodiment of the present disclosure, the first slit, the second slit, and the third slit may be parallel to one another.

According to an embodiment of the present disclosure, the second slit and the third slit may be wider than the first slit.

According to an embodiment of the present disclosure, the second slit and the third slit may be narrower than the first slit.

According to an embodiment of the present disclosure, the electronic device may further include a third slit spaced apart from the first slit and extended from a vertical edge perpendicular to the edge, and one end of the third slit may be located in the second region.

According to an embodiment of the present disclosure, the electronic device may further include a third slit spaced apart from the first slit and extended from the hole, and one end of the third slit may be located in a third region of the rear cover that corresponds to the remaining region other than the second region.

According to an embodiment of the present disclosure, the first coil may wirelessly receive power from an external device.

According to an embodiment of the present disclosure, the electronic device may further include a second coil that transmits/receives a signal in a specified frequency band with an external device.

According to an embodiment of the present disclosure, the electronic device may further include a ferrite disposed between a battery and the first coil to shield electromagnetic waves generated between the battery and the first coil.

According to an embodiment of the present disclosure, the electronic device may further include a camera module disposed in the housing to take an image through the hole.

According to an embodiment of the present disclosure, the electronic device may further include a non-conductive material disposed in the hole, the first slit, and the second slit.

An electronic device may include a housing, a battery disposed in the housing, and a first coil disposed between one face of the housing and the battery and wound around a space formed inside. The housing may include a front cover and a rear cover. The rear cover may include a hole located in a first region of the rear cover that corresponds to the space of the first coil, a first slit extended from an edge of the rear cover to the hole, a second slit spaced apart from the first slit and having one end located in a second region of the rear cover that corresponds to the first coil, and a third slit spaced apart from the first slit and disposed on the opposite side to the second slit with respect to the first slit.

According to an embodiment of the present disclosure, a first edge of the second slit may be extended from a horizontal edge parallel to the edge of the rear cover, and a second edge of the second slit may be extended from the edge of the rear cover. A first edge of the third slit may be extended from the horizontal edge of the rear cover, and a second edge of the third slit may be extended from the edge of the rear cover.

According to an embodiment of the present disclosure, one end of the third slit may be located in the second region.

According to an embodiment of the present disclosure, the first coil may wirelessly receive power from an external device.

According to an embodiment of the present disclosure, the electronic device may further include a power management circuit that charges the battery using the received power.

According to an embodiment of the present disclosure, an electronic device may include a housing that includes a first plate, a second plate opposite the first plate, and a side member surrounding space between the first plate and the second plate, a display exposed through at least a portion of the first plate, a PCB inserted between the display and the second plate, a conductive coil inserted between the PCB and the second plate, a wireless charging circuit electrically connected with the coil, and a processor electrically connected with the wireless charging circuit. The conductive coil may be wound on a plane parallel to the second plate with respect to an axis substantially normal to the second plate. When viewed from above the second plate, the conductive coil may include an outer periphery and an inner periphery that forms an inner space. The second plate may include a conductive plate that forms a large portion of the second plate, a non-conductive portion formed through the conductive plate and having a size and shape corresponding to the size and shape of the inner space of the coil when viewed from above the second plate, the non-conductive portion facing the inner space of the coil, a first non-conductive slit formed through the conductive plate and extending from a first portion of an edge of the conductive plate to the non-conductive portion when viewed from above the second plate, a second non-conductive slit formed through the conductive plate and extending from a second portion of the edge of the conductive plate to a first point within the coil when viewed from above the second plate, and a third non-conductive slit formed through the conductive plate and extending from a third portion of the edge of the conductive plate to a second point within the coil when viewed from above the second plate. The first portion of the edge of the conductive plate may be located between the second and third portions of the edge of the conductive plate when viewed from above the second plate. The first non-conductive slit may extend between the second non-conductive slit and the third non-conductive slit when viewed from above the second plate.

According to an embodiment of the present disclosure, when viewed from above the second plate, the first non-conductive slit may extend substantially parallel to at least one of the second non-conductive slit and the third non-conductive slit.

According to an embodiment of the present disclosure, an electronic device may include a housing that includes a first plate, a second plate opposite the first plate, and a side member surrounding space between the first plate and the second plate, a display exposed through at least a portion of the first plate, a PCB inserted between the display and the second plate, a conductive coil inserted between the PCB and the second plate, a wireless charging circuit electrically connected with the coil, and a processor electrically connected with the wireless charging circuit. The conductive coil may be wound on a plane parallel to the second plate with respect to an axis substantially normal to the second plate. When viewed from above the second plate, the conductive coil may include an outer periphery and an inner periphery that forms an inner space. The second plate may include a conductive plate that forms a large portion of the second plate, a first non-conductive portion formed through the conductive plate and having a size and shape corresponding to the size and shape of the inner space of the coil when viewed from above the second plate, the first non-conductive portion facing the inner space of the coil, a second non-conductive portion formed through the conductive plate and extending from a portion of an edge of the conductive plate toward the first non-conductive portion so as not to overlap the first non-conductive portion when viewed from above the second plate, a first non-conductive slit formed through the conductive plate and extending from a first part of the second non-conductive portion to the first non-conductive portion when viewed from above the second plate, a second non-conductive slit formed through the conductive plate and extending from a second part of the second non-conductive portion to a first point within the coil when viewed from above the second plate, and a third non-conductive slit formed through the conductive plate and extending from a third part of the second non-conductive portion to a second point within the coil when viewed from above the second plate. A first point of the second non-conductive portion may be located between second and third points of the second non-conductive portion when viewed from above the second plate. The first non-conductive slit may extend between the second non-conductive slit and the third non-conductive slit when viewed from above the second plate.

According to an embodiment of the present disclosure, when viewed from above the second plate, the first non-conductive slit may extend substantially parallel to at least one of the second non-conductive slit and the third non-conductive slit.

Figure 13:
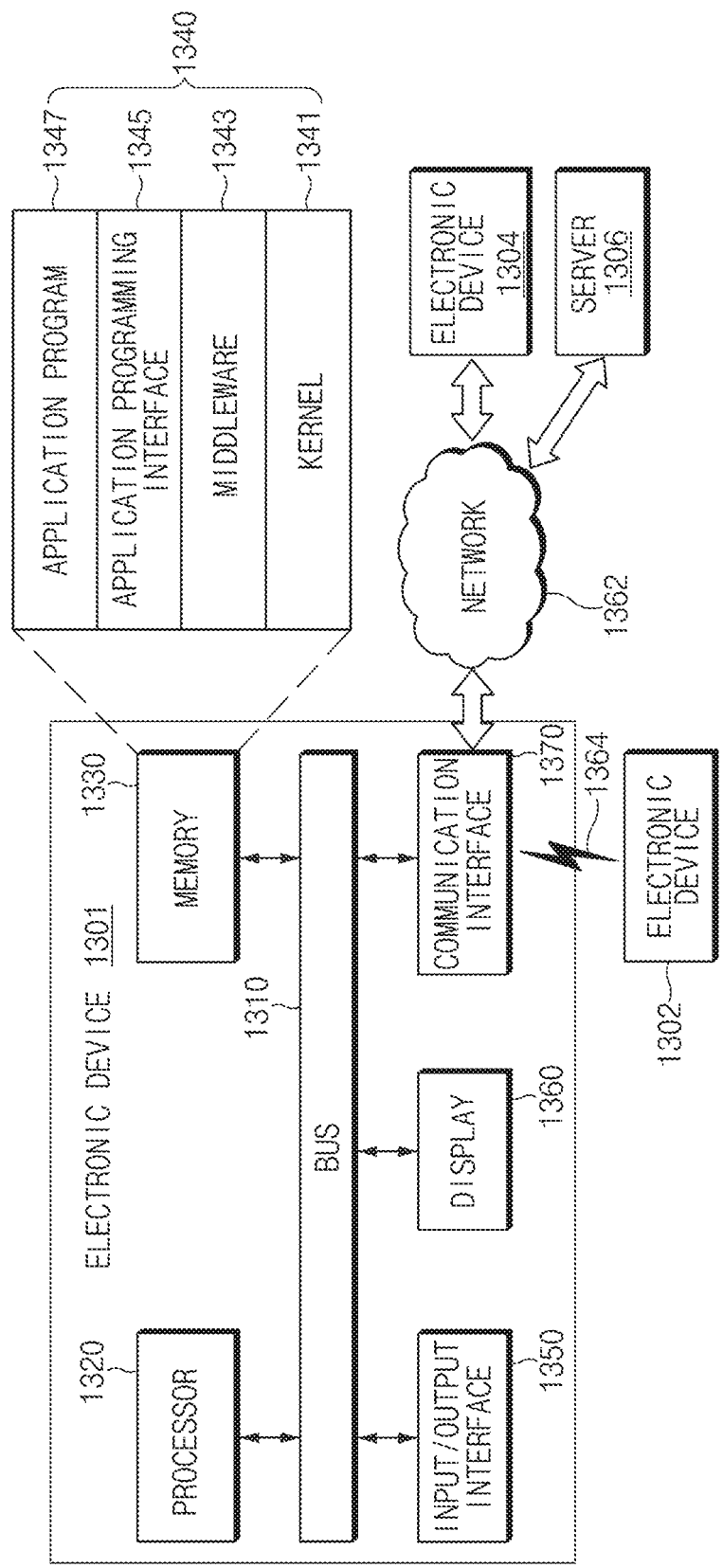
FIG. 13 illustrates an electronic device in a network environment according to an embodiment of the present disclosure.

FIG. 13 illustrates an electronic device in a network environment according to an embodiment of the present disclosure.

Referring to FIG. 13, according to an embodiment, an electronic device 1301, a first electronic device 1302, a second electronic device 1304, or a server 1306 may be connected with each other over a network 1362 or local wireless communication 1364. The electronic device 1301 may include a bus 1310, a processor 1320, a memory 1330, an input/output interface 1350, a display 1360, and a communication interface 1370. According to an embodiment, the electronic device 1301 may not include at least one of the above-described elements or may further include other element(s).

For example, the bus 1310 may interconnect the above-described elements 1310 to 1370 and may include a circuit for conveying communications (e.g., a control message and/or data) among the above-described elements.

The processor 1320 may include one or more of a CPU, an AP, or a communication processor (CP). For example, the processor 1320 may perform an arithmetic operation or data processing associated with control and/or communication of at least other elements of the electronic device 1301.

The memory 1330 may include a volatile and/or nonvolatile memory. For example, the memory 1330 may store instructions or data associated with at least one other element(s) of the electronic device 1301. According to an embodiment, the memory 1330 may store software and/or a program 1340. The program 1340 may include, for example, a kernel 1341, a middleware 1343, an application programming interface (API) 1345, and/or an application program (or "an application") 1347. At least a part of the kernel 1341, the middleware 1343, or the API 1345 may be referred to as an "operating system (OS)".

For example, the kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application program 1347 to access discrete elements of the electronic device 1301 so as to control or manage system resources.

The middleware 1343 may perform, for example, a mediation role such that the API 1345 or the application program 1347 communicates with the kernel 1341 to exchange data.

Furthermore, the middleware 1343 may process one or more task requests received from the application program 1347 according to a priority. For example, the middleware 1343 may assign the priority, which makes it possible to use a system resource (e.g., the bus 1310, the processor 1320, the memory 1330, or the like) of the electronic device 1301, to at least one of the application program 1347. For example, the middleware 1343 may process the one or more task requests according to the priority assigned to the at least one, which makes it possible to perform scheduling or load balancing on the one or more task requests.

The API 1345 may be, for example, an interface through which the application program 1347 controls a function provided by the kernel 1341 or the middleware 1343, and may include, for example, at least one interface or function (e.g., an instruction) for a file control, a window control, image processing, a character control, or the like.

The input/output interface 1350 may play a role, for example, an interface which transmits an instruction or data input from a user or another external device, to other element(s) of the electronic device 1301. Furthermore, the input/output interface 1350 may output an instruction or data, received from other element(s) of the electronic device 1301, to a user or another external device.

The display 1360 may include, for example, a liquid crystal display (LCD), a light-emitting diode (LED) display, an organic LED (OLED) display, a microelectromechanical systems (MEMS) display, or an electronic paper display. The display 1360 may display, for example, various contents (e.g., a text, an image, a video, an icon, a symbol, and the like) to a user. The display 1360 may include a touch screen and may receive, for example, a touch, gesture, proximity, or hovering input using an electronic pen or a part of a user's body.

For example, the communication interface 1370 may establish communication between the electronic device 1301 and an external device (e.g., the first electronic device 1302, the second electronic device 1304, or the server 1306). For example, the communication interface 1370 may be connected to the network 1362 over wireless communication or wired communication to communicate with the external device (e.g., the second electronic device 1304 or the server 1306).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 1364. The local wireless communication 1364 may include at least one of Wi-Fi, BT, NFC, magnetic stripe transmission (MST), a GNSS, or the like.

The MST may generate a pulse in response to transmission data using an electromagnetic signal, and the pulse may generate a magnetic field signal. The electronic device 1301 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1362 may include at least one of telecommunications networks, for example, a computer network (e.g., local area network (LAN) or wide area network (WAN)), an Internet, or a telephone network.

Each of the first and second electronic devices 1302 and 1304 may be a device of which the type is different from or the same as that of the electronic device 1301. According to an embodiment, the server 1306 may include a group of one or more servers. According to an embodiment, all or a portion of operations that the electronic device 1301 will perform may be executed by another or plural electronic devices (e.g., the first electronic device 1302, the second electronic device 1304 or the server 1306). According to an embodiment, in the case where the electronic device 1301 executes any function or service automatically or in response to a request, the electronic device 1301 may not perform the function or the service internally, but, alternatively additionally, it may request at least a portion of a function associated with the electronic device 1301 at other electronic device (e.g., the electronic device 1302 or 1304 or the server 1306). The other electronic device may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
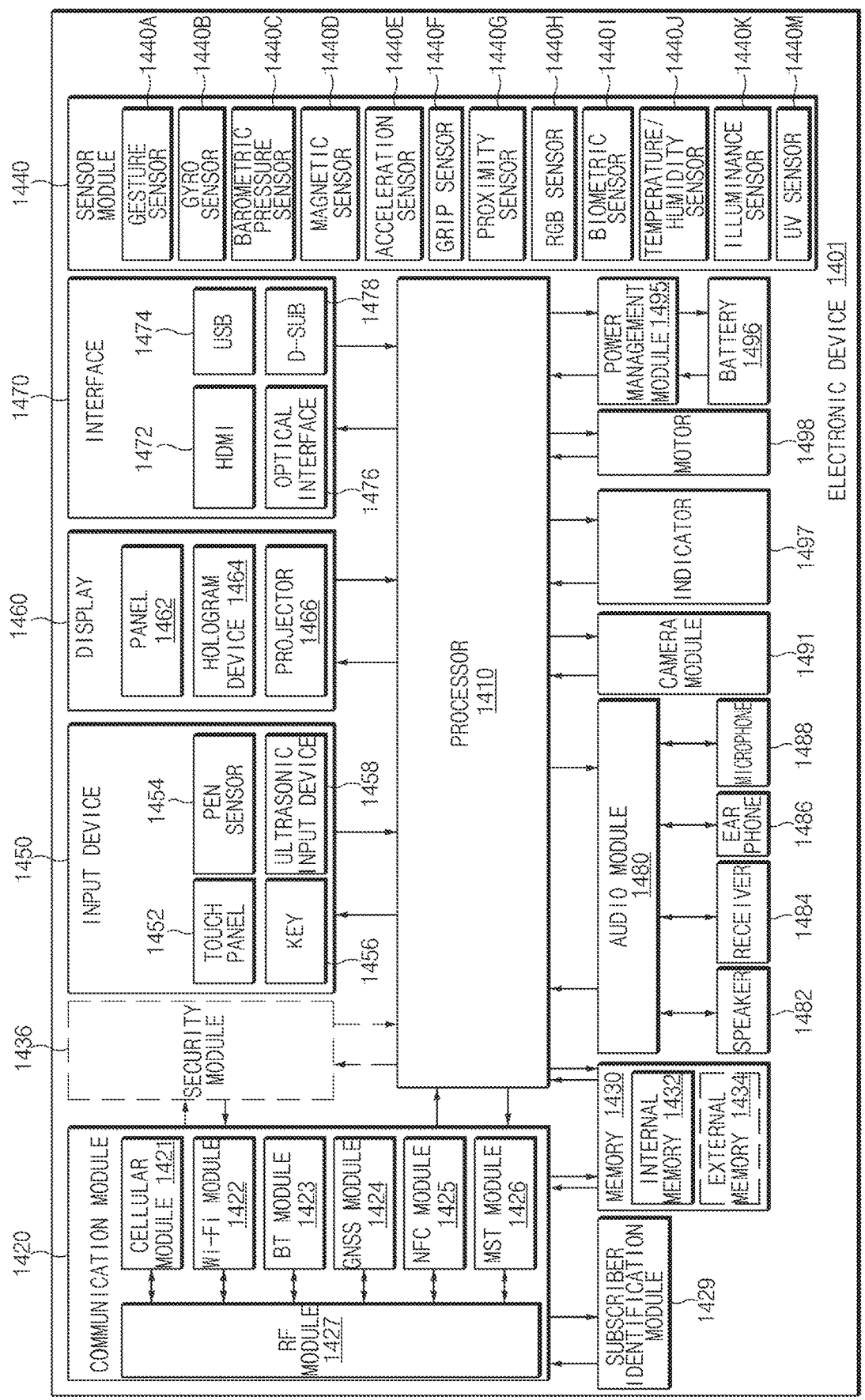
FIG. 14 is a block diagram of an electronic device according to an embodiment of the present disclosure.

FIG. 14 illustrates a block diagram of an electronic device according to an embodiment of the present disclosure.

Referring to FIG. 14, an electronic device 1401 may include, for example, all or a part of the electronic device 1301 illustrated in FIG. 13. The electronic device 1401 may include one or more processors (e.g., an AP) 1410, a communication module 1420, a subscriber identification module 1429, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive, for example, an OS or an application to control a plurality of hardware or software elements connected to the processor 1410 and may process and compute a variety of data. For example, the processor 1410 may be implemented with a system on chip (SoC). According to an embodiment, the processor 1410 may further include a GPU and/or an image signal processor. The processor 1410 may include at least a part (e.g., a cellular module 1421) of elements illustrated in FIG. 14. The processor 1410 may load an instruction or data, which is received from at least one of other elements (e.g., a non-volatile memory), into a volatile memory and process the loaded instruction or data. The processor 1410 may store a variety of data in the nonvolatile memory.

The communication module 1420 may be configured the same as or similar to the communication interface 1370 of FIG. 13. The communication module 1420 may include the cellular module 1421, a Wi-Fi module 1422, a BT module 1423, a GNSS module 1424 (e.g., a GPS module, a Glonass module, a Beidou module, or a Galileo module), a NFC module 1425, a MST module 1426 and a radio frequency (RF) module 1427.

The cellular module 1421 may provide, for example, voice communication, video communication, a character service, an Internet service, or the like over a communication network. According to an embodiment, the cellular module 1421 may perform discrimination and authentication of the electronic device 1401 within a communication network using the subscriber identification module (e.g., a SIM card) 1429. According to an embodiment, the cellular module 1421 may perform at least a portion of functions that the processor 1410 provides. According to an embodiment, the cellular module 1421 may include a CP.

Each of the Wi-Fi module 1422, the BT module 1423, the GNSS module 1424, the NFC module 1425, or the MST module 1426 may include a processor for processing data exchanged through a corresponding module, for example. According to an embodiment, at least a part (e.g., two or more) of the cellular module 1421, the Wi-Fi module 1422, the BT module 1423, the GNSS module 1424, the NFC module 1425, or the MST module 1426 may be included within one integrated-circuit (IC) or an IC package.

For example, the RF module 1427 may transmit and receive a communication signal (e.g., an RF signal). For example, the RF module 1427 may include a transceiver, a power amplifier module (PAM), a frequency filter, a low noise amplifier (LNA), an antenna, or the like. According to another embodiment, at least one of the cellular module 1421, the Wi-Fi module 1422, the BT module 1423, the GNSS module 1424, the NFC module 1425, or the MST module 1426 may transmit and receive an RF signal through a separate RF module.

The subscriber identification module 1429 may include, for example, a card and/or embedded SIM that includes a subscriber identification module and may include unique identify information (e.g., integrated-circuit card identifier (ICCID)) or subscriber information (e.g., international mobile subscriber identity (IMSI)).

The memory 1430 (e.g., the memory 1330) may include an internal memory 1432 or an external memory 1434. For example, the internal memory 1432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1434 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1434 may be operatively and/or physically connected to the electronic device 1401 through various interfaces.

A security module 1436 may be a module that includes a storage space of which a security level is higher than that of the memory 1430 and may be a circuit that guarantees safe data storage and a protected execution environment. The security module 1436 may be implemented with a separate circuit and may include a separate processor. For example, the security module 1436 may be in a smart chip or a SD card, which is removable, or may include an embedded secure element (eSE) embedded in a fixed chip of the electronic device 1401. Furthermore, the security module 1436 may operate based on an OS that is different from the OS of the electronic device 1401. For example, the security module 1436 may operate based on java card open platform (JCOP) OS.

The sensor module 1440 may measure, for example, a physical quantity or may detect an operation state of the electronic device 1401. The sensor module 1440 may convert the measured or detected information to an electric signal. For example, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H (e.g., red, green, blue (RGB) sensor), a biometric sensor 1440I, a temperature/humidity sensor 1440J, an illuminance sensor 1440K, or an UV sensor 1440M. Although not illustrated, additionally or generally, the sensor module 1440 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. According to an embodiment, the electronic device 1401 may further include a processor that is a part of the processor 1410 or independent of the processor 1410 and is configured to control the sensor module 1440. The processor may control the sensor module 1440 while the processor 1410 remains at a sleep state.

The input device 1450 may include, for example, a touch panel 1452, a (digital) pen sensor 1454, a key 1456, or an ultrasonic input unit 1458. For example, the touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user.

The (digital) pen sensor 1454 may be, for example, a part of a touch panel or may include an additional sheet for recognition. The key 1456 may include, for example, a physical button, an optical key, or a keypad. The ultrasonic input device 1458 may detect (or sense) an ultrasonic signal, which is generated from an input device, through a microphone (e.g., a microphone 1488) and may check data corresponding to the detected ultrasonic signal.

The display 1460 (e.g., the display 1360) may include a panel 1462, a hologram device 1464, or a projector 1466. The panel 1462 may be the same as or similar to the display 1360 illustrated in FIG. 13. The panel 1462 may be implemented, for example, to be flexible, transparent or wearable. The panel 1462 and the touch panel 1452 may be integrated into a single module. The hologram device 1464 may display a stereoscopic image in a space using a light interference phenomenon. The projector 1466 may project light onto a screen so as to display an image. For example, the screen may be arranged in the inside or the outside of the electronic device 1401. According to an embodiment, the display 1460 may further include a control circuit for controlling the panel 1462, the hologram device 1464, or the projector 1466.

The interface 1470 may include, for example, a HDMI 1472, a USB 1474, an optical interface 1476, or a D-sub-miniature (D-sub) 1478. The interface 1470 may be included, for example, in the communication interface 1370 illustrated in FIG. 13. Additionally or generally, the interface 1470 may include, for example, a mobile high definition link (MHL) interface, a SD card/multi-media card (MMC) interface, or an infrared data association (IrDA) standard interface.

The audio module 1480 may convert a sound and an electric signal in dual directions. At least a part of the audio module 1480 may be included, for example, in the input/output interface 1350 illustrated in FIG. 13. The audio module 1480 may process, for example, sound information that is input or output through a speaker 1482, a receiver 1484, an earphone 1486, or the microphone 1488.

For example, the camera module 1491 may shoot a still image or a video. According to an embodiment, the camera module 1491 may include at least one or more image sensors (e.g., a front sensor or a rear sensor), a lens, an image signal processor (ISP), or a flash (e.g., an LED or a xenon lamp).

The power management module 1495 may manage, for example, power of the electronic device 1401. According to an embodiment, a power management integrated-circuit (PMIC), a charger IC, or a battery or fuel gauge may be included in the power management module 1495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, and the like. The motor 1498 may convert an electrical signal into a mechanical vibration and may generate the following effects: vibration, haptic, and the like. Although not illustrated, a processing device (e.g., a GPU) for supporting a mobile TV may be included in the electronic device 1401. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing comprising a front cover and a rear cover; and
   a first coil disposed in the housing, the first coil being wound around a space formed inside the housing,
   wherein the rear cover comprises:
      a hole located in a first region of the rear cover corresponding to the space;
      a first slit extending from an edge of the rear cover to the hole; and
      a second slit spaced apart from the first slit and the hole, and extending from the edge of the rear cover, and
   wherein one end of the second slit is located in a second region of the rear cover corresponding to the first coil.

2. The electronic device of claim 1,
   wherein the rear cover further comprises a third slit spaced apart from the first slit and the hole, and extending from the edge of the rear cover, and
   wherein the third slit is disposed on an opposite side of the second slit with respect to the first slit.

3. The electronic device of claim 2, wherein one end of the third slit is located in the second region.

4. The electronic device of claim 2, wherein the one end of the second slit and the one end of the third slit are located at an outer periphery of the second region.

5. The electronic device of claim 2, wherein the one end of the second slit and the one end of the third slit are located at an inner periphery of the second region.

6. The electronic device of claim 2, wherein the first slit, the second slit, and the third slit are parallel to one another.

7. The electronic device of claim 2, wherein the second slit and the third slit are wider than the first slit.

8. The electronic device of claim 2, wherein the second slit and the third slit are narrower than the first slit.

9. The electronic device of claim 1, further comprising:
   a third slit spaced apart from the first slit and the hole, and extending from a vertical edge perpendicular to the edge of the rear cover,
   wherein one end of the third slit is located in the second region.

10. The electronic device of claim 1, further comprising:
    a third slit spaced apart from the first slit and extending from the hole,
    wherein one end of the third slit is located in a third region of the rear cover corresponding to a remaining region other than the second region.

11. The electronic device of claim 1, wherein the first coil is configured to wirelessly receive power from an external device.

12. The electronic device of claim 1, further comprising:
    a second coil configured to at least one of transmit or receive a signal in a specified frequency band with an external device.

13. The electronic device of claim 1, further comprising:
    a ferrite material disposed between a battery and the first coil, the ferrite material being configured to shield electromagnetic waves generated between the battery and the first coil.

14. The electronic device of claim 1, further comprising:
    a camera module disposed in the housing, the camera module being configured to capture an image through the hole.

15. The electronic device of claim 1, further comprising:
    a non-conductive material disposed in the hole, the first slit, and the second slit.

16. An electronic device comprising:
a housing comprising a front cover and a rear cover;
a battery disposed in the housing; and
a first coil disposed between one face of the housing and the battery, the first coil being wound around a space formed inside the housing,
wherein the rear cover comprises:
- a hole located in a first region of the rear cover corresponding to the space;
- a first slit extending from an edge of the rear cover to the hole;
- a second slit spaced apart from the first slit and the hole, and having one end located in a second region of the rear cover corresponding to the first coil; and
- a third slit spaced apart from the first slit and the hole, and disposed on an opposite side of the second slit with respect to the first slit.

17. The electronic device of claim 16,
wherein a first edge of the second slit extends from a horizontal edge parallel to the edge of the rear cover,
wherein a second edge of the second slit extends from the edge of the rear cover,
wherein a first edge of the third slit extends from the horizontal edge of the rear cover, and
wherein a second edge of the third slit extends from the edge of the rear cover.

18. The electronic device of claim 16, wherein one end of the third slit is located in the second region.

19. The electronic device of claim 16, wherein the first coil is configured to wirelessly receive power from an external device.

20. The electronic device of claim 19, further comprising:
a power management circuit configured to charge the battery using the received power.

* * * * *